United States Patent
Zhang et al.

(10) Patent No.: US 11,599,104 B2
(45) Date of Patent: Mar. 7, 2023

(54) SYSTEM CONTROL BASED ON TIME-SERIES DATA ANALYSIS

(71) Applicant: Mitsubishi Electric Research Laboratories, Inc., Cambridge, MA (US)

(72) Inventors: Jing Zhang, Weymouth, MA (US); Daniel Nikovski, Brookline, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 47 days.

(21) Appl. No.: 17/194,288

(22) Filed: Mar. 7, 2021

(65) Prior Publication Data

US 2022/0283577 A1    Sep. 8, 2022

(51) Int. Cl.
G05B 23/02    (2006.01)

(52) U.S. Cl.
CPC ....... *G05B 23/0283* (2013.01); *G05B 23/024* (2013.01); *G05B 23/0221* (2013.01); *G05B 23/0248* (2013.01); *G05B 23/0256* (2013.01)

(58) Field of Classification Search
CPC ............ G05B 23/0283; G05B 23/0221; G05B 23/024; G05B 23/0248; G05B 23/0256; G05B 23/0235; G05B 23/0272; G06F 17/16
See application file for complete search history.

(56) References Cited

U.S. PATENT DOCUMENTS

| | | | | |
|---|---|---|---|---|
| 9,256,224 | B2 * | 2/2016 | Herzog | G06K 9/6215 |
| 10,558,207 | B1 * | 2/2020 | McGuirk | G05B 23/0283 |
| 11,215,535 | B2 * | 1/2022 | Huang | B25J 9/1674 |
| 2014/0279795 | A1 * | 9/2014 | Shibuya | G05B 23/0221 |
| | | | | 706/46 |
| 2019/0187986 | A1 * | 6/2019 | Tran | G06F 9/3867 |
| 2020/0143292 | A1 * | 5/2020 | Huang | G06N 20/10 |

(Continued)

OTHER PUBLICATIONS

Zenisek et al, "Machine learning based concept drift detection for predictive maintenance", 2019, Computers & Industrial Engineering 137 (2019) 106031 (Year: 2019).*

(Continued)

*Primary Examiner* — Stephanie E Bloss
(74) *Attorney, Agent, or Firm* — Gennadiy Vinokur; Hronori Tsukamoto

(57) ABSTRACT

A controller for controlling an operation of a system is disclosed. The controller receives an input signal indicative of the operation of the system and rotates a test signal multiple times with different circular shifts to produce different rotations of the test signal forming a matrix data structure with the input signal. The input signal and the test signal are time-series data having values monotonically measured over time. The controller is further configured to apply a sliding three-dimensional (3D) window method to the matrix data structure to produce statistics of the input signal with respect to the rotations of the test signal. The sliding 3D window method iteratively moves window over the matrix data structure to compute a value of the statistics for a segment of the matrix data structure within the window. Furthermore, the controller controls the operation of the system according to the statistics of the input signal.

17 Claims, 19 Drawing Sheets

(56) References Cited

U.S. PATENT DOCUMENTS

2020/0250584 A1\* 8/2020 Wei .................. G06N 5/003
2020/0301405 A1\* 9/2020 Zhang ................ G06F 17/16

OTHER PUBLICATIONS

Tahan et al, "Performance-based health monitoring, diagnostics and prognostics for condition-based maintenance of gas turbines: A review", 2017, Applied Energy 198 (2017) 122-144 (Year: 2017).\*
Li et al, "A novel diagnostic and prognostic framework for incipient fault detection and remaining service life prediction with application to industrial rotating machines", 2019, Applied Soft Computing Journal 82 (2019) 105564 (Year: 2019).\*

\* cited by examiner

FIG. 1C

| Y | X | X$^{(0)}$ | X$^{(1)}$ | X$^{(2)}$ | X$^{(3)}$ | X$^{(4)}$ | X$^{(5)}$ | X$^{(6)}$ | X$^{(7)}$ | X$^{(8)}$ |
|---|---|---|---|---|---|---|---|---|---|---|
| $y_0$ | $x_0$ | $x_1$ | $x_2$ | $x_3$ | $x_4$ | $x_5$ | $x_6$ | $x_7$ | $x_8$ | $x_9$ |
| $y_1$ | $x_1$ | $x_2$ | $x_3$ | $x_4$ | $x_5$ | $x_6$ | $x_7$ | $x_8$ | $x_9$ | $x_0$ |
| $y_2$ | $x_2$ | $x_3$ | $x_4$ | $x_5$ | $x_6$ | $x_7$ | $x_8$ | $x_9$ | $x_0$ | $x_1$ |
| $y_3$ | $x_3$ | $x_4$ | $x_5$ | $x_6$ | $x_7$ | $x_8$ | $x_9$ | $x_0$ | $x_1$ | $x_2$ |
| $y_4$ | $x_4$ | $x_5$ | $x_6$ | $x_7$ | $x_8$ | $x_9$ | $x_0$ | $x_1$ | $x_2$ | $x_3$ |
| $y_5$ | $x_5$ | $x_6$ | $x_7$ | $x_8$ | $x_9$ | $x_0$ | $x_1$ | $x_2$ | $x_3$ | $x_4$ |
| $y_6$ | $x_6$ | $x_7$ | $x_8$ | $x_9$ | $x_0$ | $x_1$ | $x_2$ | $x_3$ | $x_4$ | $x_5$ |
| $y_7$ | $x_7$ | $x_8$ | $x_9$ | $x_0$ | $x_1$ | $x_2$ | $x_3$ | $x_4$ | $x_5$ | $x_6$ |
| $y_8$ | $x_8$ | $x_9$ | $x_0$ | $x_1$ | $x_2$ | $x_3$ | $x_4$ | $x_5$ | $x_6$ | $x_7$ |
| $y_9$ | $x_9$ | $x_0$ | $x_1$ | $x_2$ | $x_3$ | $x_4$ | $x_5$ | $x_6$ | $x_7$ | $x_8$ |

104, 106, 108, 110', 110

| | | | | | | | | | | |
|---|---|---|---|---|---|---|---|---|---|---|
| $y_9$ | $x_9$ | $x_0$ | $x_1$ | $x_2$ | $x_3$ | $x_4$ | $x_5$ | $x_6$ | $x_7$ | $x_8$ |
| $y_8$ | $x_8$ | $x_9$ | $x_0$ | $x_1$ | $x_2$ | $x_3$ | $x_4$ | $x_5$ | $x_6$ | $x_7$ |
| $y_7$ | $x_7$ | $x_8$ | $x_9$ | $x_0$ | $x_1$ | $x_2$ | $x_3$ | $x_4$ | $x_5$ | $x_6$ |
| $y_6$ | $x_6$ | $x_7$ | $x_8$ | $x_9$ | $x_0$ | $x_1$ | $x_2$ | $x_3$ | $x_4$ | $x_5$ |
| $y_5$ | $x_5$ | $x_6$ | $x_7$ | $x_8$ | $x_9$ | $x_0$ | $x_1$ | $x_2$ | $x_3$ | $x_4$ |
| $y_4$ | $x_4$ | $x_5$ | $x_6$ | $x_7$ | $x_8$ | $x_9$ | $x_0$ | $x_1$ | $x_2$ | $x_3$ |
| $y_3$ | $x_3$ | $x_4$ | $x_5$ | $x_6$ | $x_7$ | $x_8$ | $x_9$ | $x_0$ | $x_1$ | $x_2$ |
| $y_2$ | $x_2$ | $x_3$ | $x_4$ | $x_5$ | $x_6$ | $x_7$ | $x_8$ | $x_9$ | $x_0$ | $x_1$ |
| $y_1$ | $x_1$ | $x_2$ | $x_3$ | $x_4$ | $x_5$ | $x_6$ | $x_7$ | $x_8$ | $x_9$ | $x_0$ |
| $y_0$ | $x_0$ | $x_1$ | $x_2$ | $x_3$ | $x_4$ | $x_5$ | $x_6$ | $x_7$ | $x_8$ | $x_9$ |
| $Y$ | $X$ | $X^{(0)}$ | $X^{(1)}$ | $X^{(2)}$ | $X^{(3)}$ | $X^{(4)}$ | $X^{(5)}$ | $X^{(6)}$ | $X^{(7)}$ | $X^{(8)}$ |

FIG. 1D

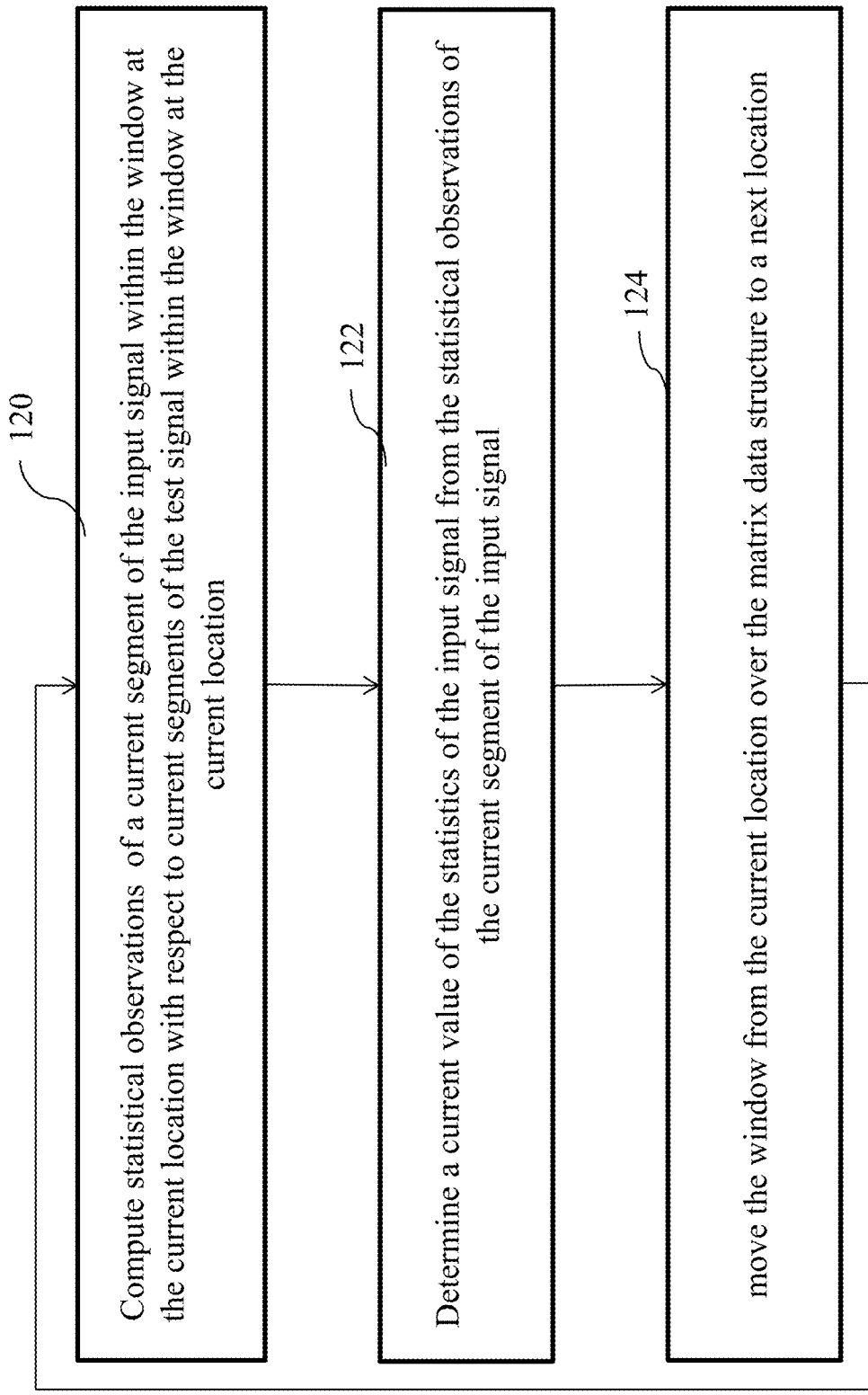

FIG. 1F

| Y | X | $X^{(0)}$ | $X^{(1)}$ | $X^{(2)}$ | $X^{(3)}$ | $X^{(4)}$ | $X^{(5)}$ | $X^{(6)}$ | $X^{(7)}$ | $X^{(8)}$ |
|---|---|---|---|---|---|---|---|---|---|---|
| $y_0$ | $x_0$ | $x_1$ | $x_2$ | $x_3$ | $x_4$ | $x_5$ | $x_6$ | $x_7$ | $x_8$ | $x_9$ |
| $y_1$ | $x_1$ | $x_2$ | $x_3$ | $x_4$ | $x_5$ | $x_6$ | $x_7$ | $x_8$ | $x_9$ | $x_0$ |
| $y_2$ | $x_2$ | $x_3$ | $x_4$ | $x_5$ | $x_6$ | $x_7$ | $x_8$ | $x_9$ | $x_0$ | $x_1$ |
| $y_3$ | $x_3$ | $x_4$ | $x_5$ | $x_6$ | $x_7$ | $x_8$ | $x_9$ | $x_0$ | $x_1$ | $x_2$ |
| $y_4$ | $x_4$ | $x_5$ | $x_6$ | $x_7$ | $x_8$ | $x_9$ | $x_0$ | $x_1$ | $x_2$ | $x_3$ |
| $y_5$ | $x_5$ | $x_6$ | $x_7$ | $x_8$ | $x_9$ | $x_0$ | $x_1$ | $x_2$ | $x_3$ | $x_4$ |
| $y_6$ | $x_6$ | $x_7$ | $x_8$ | $x_9$ | $x_0$ | $x_1$ | $x_2$ | $x_3$ | $x_4$ | $x_5$ |
| $y_7$ | $x_7$ | $x_8$ | $x_9$ | $x_0$ | $x_1$ | $x_2$ | $x_3$ | $x_4$ | $x_5$ | $x_6$ |
| $y_8$ | $x_8$ | $x_9$ | $x_0$ | $x_1$ | $x_2$ | $x_3$ | $x_4$ | $x_5$ | $x_6$ | $x_7$ |
| $y_9$ | $x_9$ | $x_0$ | $x_1$ | $x_2$ | $x_3$ | $x_4$ | $x_5$ | $x_6$ | $x_7$ | $x_8$ |

FIG. 2

Algorithm 1 Computation of Matrix Profile Using Double-ended Queue or Segment Tree 1: procedure MatrixProfileDequeSegTree($X$, $m$, $option$)
2:    $n \leftarrow$ length of $X$
3:    initialize $MP$ as an array with length $n - m + 1$ and each element being a large enough float number (e.g., $1.0 \times 10^6$)
4:    for $i = 0, 1, \ldots, n - 2$ do
5:      $eleDist \leftarrow$ EleWiseDistToRotTimeSeries($X$, $i$)
6:      if $option$ equals "deque" then
7:        $slidMax \leftarrow$ SlidMaxDeque($eleDist$, $m$)
8:      else if $option$ equals "segtree" then
9:        $ST \leftarrow$ SegmentTree($eleDist$)
10:       $slidMax \leftarrow$ SlidMaxSegTree($ST$, $m$)
11:      end if
12:      for $j = 0, 1, \ldots, n - m$ do
13:        if $i \le n - m - j - 1$ or $i \ge n - j - 1$ then
14:          $MP[j] \leftarrow \min(MP[j], slidMax[j])$
15:        end if
16:      end for
17:    end for
18:    return $MP$
19: end procedure

FIG. 4A

Algorithm 1.1 Computation of Element-wise Distance to Rotated Time Series.

1: procedure EleWiseDistToRotTimeSeries($X, i$)
2:     $n \leftarrow$ length of $X$
3:     $eleDist \leftarrow$ the $i$-th rotated $X$ (i.e., $X^{(i)}$)
4:     for $l = 0, 1, \ldots, n-1$ do
5:         $eleDist[l] \leftarrow |eleDist[l] - X[l]|$
6:     end for
7:     return $eleDist$
8: end procedure

FIG. 4B

Algorithm 1.2 Finding Sliding Maxima Using Double-ended Queue.

1: procedure SlidMaxDeque($X, m$)
2:    $n \leftarrow$ length of $X$
3:    if $m$ equals 1 then
4:       return $X$
5:    end if
6:    initialize $Q$ as a new empty double-ended queue
7:    initialize $slidMax$ as a new empty vector
8:    for $l = 0, 1, \ldots, n-1$ do
9:       if $Q$ is nonempty and $Q[0] \leq l - m$ then
10:          remove the leftmost element from $Q$
11:       end if
12:       while $Q \neq \emptyset$ and $X[l] > X[Q[-1]]$ do
13:          remove the rightmost element from $Q$
14:       end while
15:       append $l$ to the rightmost of $Q$
16:       if $l \geq m - 1$ then
17:          append $X[Q[0]]$ to the rightmost of $slidMax$
18:       end if
19:    end for
20:    return $slidMax$
21: end procedure

FIG. 4C

| Algorithm 1.3.1 | Construction of Segment Tree. |
|---|---|

1: procedure SegmentTree($X$) [13]
2:    $n \leftarrow$ length of $X$
3:    initialize a new zero array $ST$ with length $2n$
4:    copy $X$ to the second half of $ST$
5:    for $l = n - 1 \ldots 1$ do
6:       $ST[l] \leftarrow \max(ST[2 \times l], ST[2 \times l + 1])$
7:    end for
8:    return $ST$
9: end procedure

FIG. 4D

Algorithm 1.3.2 Finding Sliding Maxima Using Segment Tree.

1: procedure SlidMaxSegTree($ST, m$)
2:    $n \leftarrow$ (length of $ST$)/2
3:    initialize $slidMax$ as a new empty vector
4:    for $j = 0, 1, \ldots, n - m$ do
5:       $rm \leftarrow$ RangeMaximum($ST, j, j + m$)
6:       append $rm$ to the rightmost of $slidMax$
7:    end for
8:    return $slidMax$
9: end procedure

FIG. 4E

Algorithm 1.3.3 Computation of Range Maximum in Segment Tree.

1: procedure RangeMaximum(*ST,left,right*) [13]
2: $n \leftarrow$ (length of *ST*)/2
3: *left* $\leftarrow$ *left* + $n$, *right* $\leftarrow$ *right* + $n$
4: initialize *max* with a small enough float number (e.g., $-1.0 \times 10^6$)
5: while *left* < *right* do
6:    if *left* is odd then
7:       *max* $\leftarrow$ max(*max*, *ST*[*left*])
8:       *left* $\leftarrow$ *left* + 1
9:    end if
10:   if *right* is odd then
11:      *right* $\leftarrow$ *right* − 1
12:      *max* $\leftarrow$ max(*max*, *ST*[*right*])
13:   end if
14:   *left* $\leftarrow$ *left*/2, *right* $\leftarrow$ *right*/2
15: end while
16: return *max*
17: end procedure

FIG. 4F

SYSTEM CONTROL BASED ON TIME-SERIES DATA ANALYSIS

TECHNICAL FIELD

The present disclosure relates generally to system control, and more particularly to an apparatus for controlling an operation of a system based on time-series data analysis.

BACKGROUND

Modern computer systems collect large amount of information from various physical systems and/or machines. Maintaining such physical systems (hereinafter, systems) in good working order is an important task associated with their operation, and how and when maintenance is performed has a very significant effect on economic aspect of their operation. One maintenance strategy is to repair a system only after it fails (also known as corrective maintenance). This strategy is not optimal, because repairs of an entire failed system may be costlier than replacing a single part before the system breaks, and also system failure may result in wasted materials, unacceptable product quality, and might even endanger the personnel operating the system. In situations when the corrective maintenance is not a viable or economic option, a different strategy is used—regular maintenance of the system at fixed intervals, for example one year. Examples of such safety critical systems are elevators and cars; generally, their maintenance is done once per year, and corresponding certificates are issued. Such strategy is commonly known as preventive maintenance.

Although the preventive maintenance addresses safety issues that are associated with the system maintenance, there are many cases when it is not economically optimal. For example, in the preventive maintenance, a length of a maintenance cycle is often arbitrary (e.g., one year or one month), and according to convenience of inspection authorities and logistics of an inspection process (e.g. issuing inspection stickers for cars), than with the actual need of the systems. Further, a single maintenance cycle may not be optimal for all systems in a group, where some of the systems are new, and may require maintenance not very often, whereas older systems may require maintenance much more often. In this situation, a time-based preventive maintenance strategy is used. The time-based preventive maintenance is also referred to as predictive maintenance.

The predictive maintenance strategy allows use of sensors to measure system parameters. As instrumentation of system operations increases, large amounts of data are being collected from the sensors that monitor the operations of the systems. The data from some sensors may also be generated at a relatively high frequency, which further results in large amount of data. The data from the sensors associated with systems may be analyzed to determine a state of the system. For example, in some cases, a data stream from a sensor associated with the system may be analyzed to determine whether the system is not performing as expected, referred to as equipment failure. However, the predictive maintenance strategy is time-consuming and demands for training data. For instance, when adapting the predictive maintenance to actual environment, the predictive maintenance demands for an amount of training data to analyze the data streams from the sensors and further takes long time to gain high-accuracy learning model. For example, in a case of a group of systems comprising older systems and new systems, the training data for all the systems in the group needs to be collected and further a model for each system in the group needs to be designed and trained. Furthermore, the predictive maintenance strategy prevents quick adaptations, as models for different systems need to be designed differently.

Accordingly, there is a need for an efficient apparatus for controlling the operation of system in an optimal and feasible manner.

SUMMARY

It is objective of some embodiments to provide a controller to produce statistics for time-series data indicative of an operation of a system. It is also objective of some embodiments to control the operation of the system, according the produced statistics of the time-series data.

Some embodiments are based on recognition that an input signal needs to be compared with a test signal for controlling the operation of the system. As used herein, the system may include, but are not limited to, an HVAC (Heating, Ventilating, and Air-Conditioning) system, a robotic assembly, an elevator door system, a vehicle, and a motor. Examples of the operation of the system may include, but are not limited to, operating the HVAC system according to specific parameters, operating a robot arm according to a specific task, and opening/closing elevator doors. In some embodiments, the test signal and the input signal may be the time-series data indicative of the operation of the system. In some other embodiments, the test signal and the input signal may be two different signals, where the test signal is indicative of a normal operation of the system and the input signal is indicative of a real-time operation of the system. As used herein, the time-series data is a sequence of values measured and/or determined sequentially in time.

Some embodiments are based on realization that producing the statistics of the input signal with respect to different rotations of the test signal is similar to comparing the input signal with respect to the test signal. To this end, it is objective of some embodiments to rotate the test signal multiple times with different circular shifts to produce different rotations of the test signal. In some embodiments, the test signal is rotated with a circular shift by moving a final entry of the test signal to a first position while shifting all other entries to the next position. In some other embodiments, the test signal is rotated with a circular shift by moving a first entry of the test signal to a final position while shifting all other entries to a previous position. A value of the circular shift determines a number of samples of the test signal forming an entry. It is also objective of some embodiments to form a matrix data structure using at least the different rotations of the test signal and the input signal.

Some embodiments are based on realization that the statistics of the input signal with respect to different rotations of the test signal is produced by applying a sliding three-dimensional (3D) window method to the matrix data structure. The 'sliding' part of the sliding three-dimensional (3D) window method may refer to that the sliding three-dimensional (3D) window method in which a window is iteratively moved over the matrix data structure to determine the statistics of the input signal. The 'three-dimensional (3D) window' part of the sliding three-dimensional (3D) window method may refer to that the sliding three-dimensional (3D) window method determining the statistics for the input signal within the window with respect to all other segments (may be different rotations of the test signal or may be complete test signal) defined within the same window.

Accordingly, the sliding 3D window method iteratively moves the window over the matrix data structure to determine a value of the statistics for a segment of the input signal in the matrix data structure within the window. Further, the sliding three-dimensional (3D) window method is used to determine the statistics for a segment of the input signal with respect to different rotations of the test signal or the complete test signal using a single window. Therefore, the sliding three-dimensional (3D) window method disclosed herein determines the statistics of the input signal in a feasible manner in comparison to currently available sliding methods that use multiple windows to compare a segment of the input signal with the test signal. For instance, when the test signal and the input signal are same, the currently available sliding methods compares a segment of input signal defined within the window with multiple other segments of the input signal defined within other multiple windows. However, in case of the sliding three-dimensional (3D) window method, the segment of the input signal defined within the window is compared with multiple other segments of the input signal defined within the same window.

To determine a current value of the statistics of the input signal for the window at a current location, the sliding 3D window method computes statistical observations of a current segment of the input signal within the window at the current location with respect to current segments of each of the rotations of the test signal within the window at the current location. It is objective of some embodiments to uses at least some corresponding statistical observations determined for the window at a previous location, while computing the statistical observations of a current segment of the input signal within the window at the current location. To this end, the computation to be performed for producing the statistics of the input signal may be reduced. Accordingly, the statistics of the input signal may be determined in a more optimal and/or efficient manner.

Some embodiments are based on realization that the statistical observations for current segment of the input signal may include valid statistical observations and invalid statistical observation. The valid statistical observation may include a difference between values of the current segment of the input signal with values of each valid test signal segment. The difference between values of the current segment of the input signal with values of each valid test signal segment defines an unnormalized Euclidean distance. The invalid statistical observation may include a difference between values of the current segment of the input signal with values of each invalid test signal segment. As used herein, the invalid test signal segments may correspond to current segments of the rotations of the test signal defined with the window that violate the monotonicity of time indices defined in the test signal. The valid test signal segments may correspond to current segments of the rotations of the test signal defined with the window that do not violate the monotonicity of time indices defined in the test signal.

It is objective of some embodiments to compute the current value of the statistics of the input signal for the window at the current location from the statistical observations for the current segment of the input signal by excluding the invalid statistical observations computed with respect to the current segments of the rotations of the test signal violating monotonicity of the test signal. For instance, the current value may be at least one of a maximum or minimum of the valid statistical observation.

Further, in some embodiments, in the sliding 3D window method, the window is moved from the current location over the matrix data structure to a next location after determining the current value of the statistics of the input signal. Some embodiments determine a value of a shift for moving the window in the sliding 3D window method. In some embodiments, the value of the shift for moving the window in the sliding 3D window method is equal to a difference between neighboring values of the circular shifts for rotating the test signal. In this way, in the sliding 3D window method, the window iteratively moves over the matrix data structure to produce the statistics of the input signal.

Some embodiments are based on understanding that the statistics of the input signal are determined by a subroutine that computes maximum values of the window applied by the sliding three-dimensional window for the given time-series data (e.g. the input signal) and the given window size m. To this end, some embodiments apply a brute-force approach that is configured to search a maximum value for each and every window of the window size m, leading to a time complexity in an order of $O(m \, (n-m+1))=O(mn)$, which is dependent on the window size m. Since the time complexity of the brute-force approach is dependent on the window size m, time required to compute the statistics (using the brute-force approach) would proportionally increase with respect to the window size m. To this end, it is objective of some embodiments to compute statistics of the input signal using at least one of a double-ended queue method or a segment tree method such that the time complexity is independent of the window size m and allows to compute the statistics of the input signal in less amount time, in comparison to the brute-force approach.

Some embodiments are based on understanding that an accurate window size m of the window is not known to capture 'true essence' of the input signal or to capture 'true essence' of the input signal with respect to the test signal. To this end, it is objective of some embodiments to apply the sliding three-dimensional (3D) window method to produce multidimensional statistics of the input signal by applying multiple windows of different window sizes at each location in the input signal of the matrix data structure. In some embodiments, while computing a first dimension of the current value of the statistics of the input signal for the window at the current location, the sliding 3D window method reuses at least some statistical observations determined for an overlapping window of a different size than the size of the window at the current location. Further, this flexibility of applying multiple windows of different window sizes allows the produced multidimensional statistics of the input signal to control the operation of the system in different applications.

Some embodiments are based on realization that the operation of the system is controlled in the optimal and feasible manner using the statistics (or the multidimensional statistics) of the input signal that is produced in the optimal and feasible manner. To this end, some embodiments stop the operation of the system or determine control commands for an actuator of the system upon detecting an anomaly in the statistics of the input signal. Some other embodiments determine constraints of the operation of the system based on the statistics of the input signal and determine control commands for actuators of the system subject to the determined constraints. Some yet other embodiments determine the statistics of the input signal at the end of an operational cycle of the system to adjust the operation of the system for the next operational cycle.

According to an embodiment, a controller for controlling an operation of a system is provided. The controller controls the operation of the system based on comparison of an input signal with a test signal, wherein the input signal and the test signal are time-series data having values monotonically measured over time, comprising: at least one processor; and memory having instructions stored thereon that, when executed by the at least one processor, cause the controller to: receive the input signal indicative of the operation of the system; rotate the test signal multiple times with different circular shifts to produce different rotations of the test signal forming a matrix data structure with the input signal; apply a sliding three-dimensional (3D) window method to the matrix data structure to produce statistics of the input signal with respect to the rotations of the test signal, wherein the sliding 3D window method iteratively moves a window over the matrix data structure to compute a value of the statistics for a segment of the matrix data structure within the window, wherein, to compute a current value of the statistics of the input signal for the window at a current location, the sliding 3D window method is configured to: compute statistical observations of a current segment of the input signal within the window at the current location with respect to current segments of each of the rotations of the test signal within the window at the current location using at least some corresponding statistical observations determined for the window at a previous location; determine the current value of the statistics of the input signal from the statistical observations of the current segment of the input signal excluding invalid statistical observations determined with respect to current segments of the rotations of the test signal violating monotonicity of the time-series data; and move the window from the current location over the matrix data structure to a next location; and control the operation of the system according to the statistics of the input signal.

BRIEF DESCRIPTION OF THE DRAWINGS

FIG. 1C illustrates a schematic for forming a matrix data structure, according to some embodiments of the present disclosure.

FIG. 1D illustrates a window applied to the matrix data structure, according to some embodiments of the present disclosure.

FIG. 1E illustrates a sliding three-dimensional (3D) window method for determining the statistics of an input signal, according to some embodiments of the present disclosure.

FIG. 1F illustrates a schematic showing iterative process of the sliding three-dimensional (3D) window method, according to some embodiments of the present disclosure.

FIG. 2 illustrates a schematic showing the multiple windows of different window sizes applied by the sliding three-dimensional (3D) window method, according to some embodiments of the present disclosure.

FIG. 4A illustrates an overview of an algorithm for computing statistics of the input signal, according to some embodiments of the present disclosure.

FIG. 4B illustrates an algorithm for computing element-wise distances between the input signal and the different rotated versions of the test signal, according to some embodiments of the present disclosure.

FIG. 4C illustrates an algorithm for determining maximum values of a window applied by the sliding three-dimensional window method, using a double-ended queue method, according to some embodiments of the present disclosure.

FIG. 4D illustrates an algorithm for constructing a segment tree, according to some embodiments of the present disclosure.

FIG. 4E illustrates an algorithm for determining the maximum values of the window applied by the sliding three-dimensional window method, using a segment tree method, according to some embodiments of the present disclosure.

FIG. 4F illustrates an algorithm for computing a range maximum value based on the segment tree and a window size, according to some embodiments of the present disclosure.

DETAILED DESCRIPTION

In the following description, for purposes of explanation, numerous specific details are set forth in order to provide a thorough understanding of the present disclosure. It will be apparent, however, to one skilled in the art that the present disclosure may be practiced without these specific details. In other instances, apparatuses and methods are shown in block diagram form only in order to avoid obscuring the present disclosure.

As used in this specification and claims, the terms "for example," "for instance," and "such as," and the verbs "comprising," "having," "including," and their other verb forms, when used in conjunction with a listing of one or more components or other items, are each to be construed as open ended, meaning that that the listing is not to be considered as excluding other, additional components or items. The term "based on" means at least partially based on. Further, it is to be understood that the phraseology and terminology employed herein are for the purpose of the description and should not be regarded as limiting. Any heading utilized within this description is for convenience only and has no legal or limiting effect.

Figure 1A:
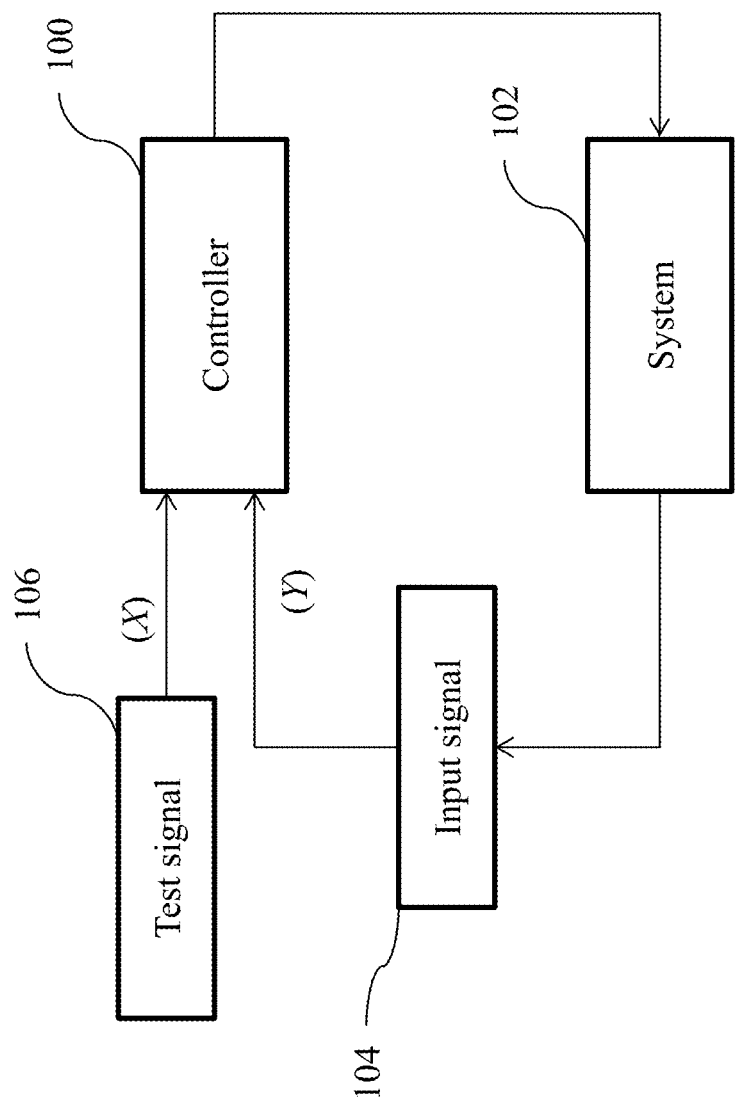
FIG. 1A illustrates a block diagram showing a controller to control an operation of a system, according to some embodiments of the present disclosure.

FIG. 1A illustrates a block diagram showing a controller 100 to control an operation of a system 102, according to some embodiments of the present disclosure. Examples of the system 102 may include, but are not limited to, an HVAC (Heating, Ventilating, and Air-Conditioning) system, a robotic assembly, an elevator door system, a vehicle, and a motor (for instance, an induction motor, a servo motor and the like). Examples of the operation of the system 102 may include, but are not limited to, operating the HVAC system according to specific parameters, operating a robot arm according to a specific task, and opening/closing elevator doors, and moving a mass by the servo motor according to a specific trajectory. The controller 100 may be associated with the system 102 to control the operation of the system 102. According to an embodiment, the controller 100 is configured to receive, from the system 102, an input signal (Y) 104 and compare the input signal 104 with a test signal (X) 106 to control the operation of the system 102. The input signal 104 and the test signal 106 are time-series data having values monotonically measured over time. In other words, the input signal 104 and the test signal 106 are time-series of values. A time series is a sequence of values measured and/or determined sequentially in time. Each value in a time series corresponds to an instance of time that may be defined by a time stamp associated with the value. The values in the time series are arranged sequentially according to their time stamps. An instance of time may be indicated by an absolute time and/or by a relative time, e.g., the time since the start of the operation of the system 102. Relative time instances are advantageous, because they may facilitate alignment of measurements of different signals representing different executions of the operation of the system 102. Further, the time-series data include time-series of values of measurements of physical variables of the operation of the system 102. Examples of such physical variables includes torque and/or voltages of a motor moving a mass, positions, velocities and/or acceleration of the mass, etc. Each value of the time-series data may be single dimension including measurement of a physical quantity of the operation of the system 102 or may be multi-dimensional including measurements of different physical quantities of the operation of the system 102.

The input signal 104 may be mathematically represented as $Y=[y_0, y_1, \ldots, y_{n-1}]$, where 'n' indicates a length of the input signal 104 and $Y[l]=y_l \in \mathbb{R}$ is a value sampled at a time instance l (or at location l), l=0,1,n−1. For instance, when the length of the input signal 104 is ten (e.g. n=10), the input signal 104 may be represented as $Y=[y_0, y_1, \ldots, y_9]$. The test signal 106 and the input signal 104 may be of the same length n. The test signal 106 may be mathematically represented as $X=[x_0, x_1, \ldots, x_{n-1}]$. For instance, when the length of the test signal 106 is ten, the test signal 106 may be represented as $X=[x_0, x_1, \ldots, x_9]$. According to some embodiments, the controller 100, for comparing the input signal 104 with the test signal 106, forms a matrix data structure by producing different rotated versions of the test signal 106. For instance, the controller 100 is configured to produce the different rotated versions of the test signal 106, as explained in the detailed description of the FIG. 1B.

Figure 1B:
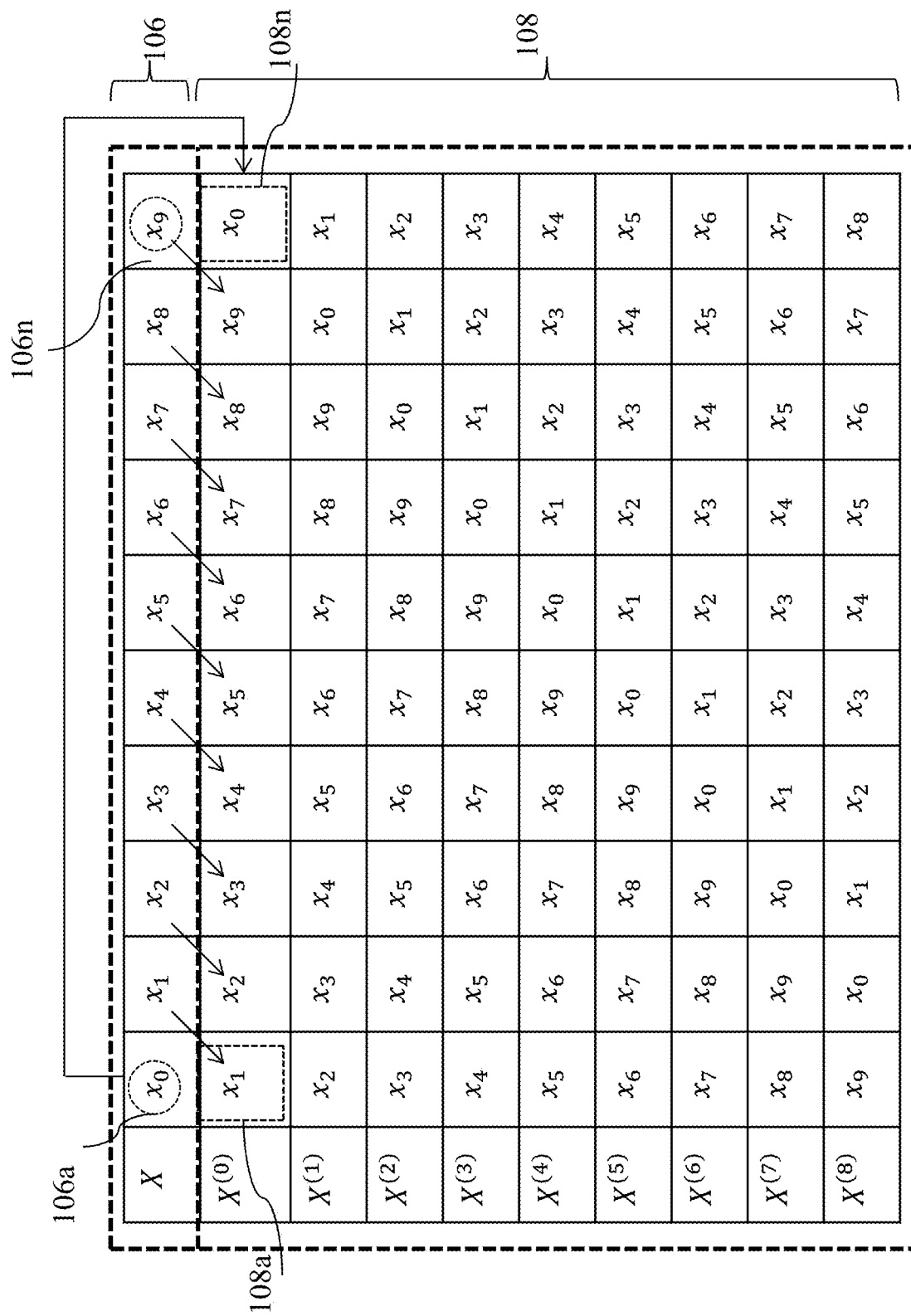
FIG. 1B illustrates a schematic for producing different rotated versions of a test signal, according to some embodiments of the present disclosure.

FIG. 1B illustrates a schematic for producing different rotated versions 108 of the test signal 106, according to some embodiments of the present disclosure. According to an embodiment, the controller 100 is configured to rotate the test signal 106 multiple times with different circular shifts to produce the different rotated versions 108 of the test signal 106. The different rotated versions 108 of the test signal 106 include a plurality of rotated test signals, where each rotated test signal of the plurality of rotated test signals is rotated at a different circular shift from the test signal 106. In some embodiments, the circular shift used to rotate the test signal 106 may be a function whose circular shift values (also referred to as values of the circular shifts) follow a natural number sequence (e.g. 1, 2, 3, . . . , n−1). For example, when the circular shift is the function that follows the natural number sequence, the controller 100 rotates, using the circular shift, the test signal 106 n−1 times to produce the different rotated versions 108, which include n−1 number of rotated test signals, as illustrated in FIG. 1B. In other words, when the circular shift is the function that follows the natural number sequence, the controller 100 rotates, using the circular shift values (e.g. 1, 2, 3, . . . , n−1), the test signal 106 to produce the different rotated versions 108, where a first rotated test signal of the different rotated versions 108 is rotated at a circular shift value of one, a second rotated test signal of the different rotated versions 108 is rotated at a circular shift value of two and similarly a 'n−1' rotated test signal of the different rotated versions 108 is rotated at a circular shift value of n−1. Accordingly, the circular shift values (e.g. 1, 2, 3, . . . , n−1) determine a number of samples of the test signal 106 to be shifted to form the corresponding rotated test signals (the first rotated test signal, the second rotated test signal, . . . , the 'n−1' rotated test signal), respectively. Further, when the circular shift is the function that follows the natural number sequence, the controller 100 produces the n−1 number of rotated test signals such that a difference in the circular shift values between any two neighboring rotated test signals in the n−1 number of the rotated test signals is equal to one. In some other embodiments, the circular shift used to rotate the test signal 106 may be a function whose circular shift values follow an even natural number sequence (e.g. 2, 4, . . . , n−2). In yet some other embodiments, the circular shift used to rotate the test signal 106 may be a function whose circular shift values follow an odd natural number sequence (e.g. 1, 3, . . . , n−1).

Further, in some embodiments, the circular shift used to rotate the test signal 106 may be a left circular shift. When the circular shift corresponds to the left circular shift, the controller 100 produces a first rotated test signal of the different rotated versions 108 by moving a first entry 106a (e.g. a value $x_0$) of the test signal 106 to a final position 108n while shifting all other entries to a previous location, as illustrated in FIG. 1B. In some other embodiments, the circular shift used to rotate the test signal 106 may be a right circular shift. When the circular shift corresponds to the right circular shift, the controller 100 produces a first rotated test signal of the different rotated versions 108 by moving a final entry 106n (e.g. a value $x_9$) of the test signal 106 to a first position 108a while shifting all other entries to a next location.

For example, when the circular shift is the function that follows the natural number sequence and corresponds to the left circular shift, the controller 100 produces the n−1 number of rotated test signals, which are mathematically represented as $X^{(i)}=[x_{i+1}, x_{i+2}, \ldots, x_{n-1}, x_0, x_1m, \ldots, x_i]$, where i=0,1, . . . , n−2. Notably, $x_i$ portion of the input and/or test signal can include one or multiple samples of the signal.

In this way, the controller 100 rotates the test signal 106 multiple times with different circular shifts to produce the different rotated versions 108 of the test signal 106. Further, the controller 100 is configured to form the matrix data structure using the different rotated versions 108 of the test signal 106, as explained in the detailed description of FIG. 1C.

FIG. 1C illustrates a schematic for forming a matrix data structure based on the input signal 104 and the different rotated versions 108 of the test signal 106, according to some embodiments of the present disclosure. In some embodiments, the test signal 106 and the input signal 104 may be two different time-series data. For instance, the test signal 106 may be time-series data indicative of a normal operation of the system 102 and the input signal 104 may be time-series data indicative of the operation of the system 102. As used herein, the normal operation of the system 102 may correspond to an operation executed by the system 102 in a first past time period and does not include any anomaly or fault, when the system 102 is configured for a specific requirement. As used herein, the operation of the system 102 may correspond to an operation executed by the system 102 in real-time or in a second past time period and may or may not include an anomaly or fault, when the system 102 is configured for a specific requirement. The second past time period is different from the first past time period. To this end, the controller 100 is configured to form, using the test signal 106 and the different rotated versions 108 of the test signal 106, the matrix data structure 110 with the input signal 104. For instance, the controller 100 forms the matrix data structure 110 that comprises a number of columns 'a' (for instance, a=n) and a number of rows 'b', where a first row in the matrix data structure 110 is the input signal 104, a second row in the matrix data structure 110 is the test signal 106, and remaining b−2 rows are the different rotated versions 108 of the test signal 106. In this way, the controller 100 may form the matrix data structure 110 with the input signal 104 using the test signal 106 and the different rotated versions 108 of the test signal 106, when the test signal 106 and the input signal 104 are the two different time-series data.

In some other embodiments, the test signal 106 may be a copy of the input signal 104. For example, the test signal 106 is equal to the input signal 104 (i.e. X=Y). For instance, the test signal 106 and the input signal 104 may be the real-time operation of the system 102. To this end, the controller 100 is configured to form, using the different rotated versions 108 of the test signal 106, a matrix data structure 110' with the test signal 106. For instance, the controller 100 forms the matrix data structure 110' that comprises a number of columns 'a' (for instance, a=n) and a number of rows 'b', where a first row in the matrix data structure 110' is the test signal 106 and remaining b−1 rows are the different rotated versions 108 of the test signal 106.

In such a manner, the controller 100 may form the matrix data structure 110' with the test signal 106 using the different rotated versions 108 of the test signal 106, when the test signal 106 is the copy of the input signal 104. Some embodiments are based on realization that statistics of the input signal 104 with respect to the test signal 106 and the different rotated versions 108 of the test signal 106 within the matrix data structure 110 is produced such that the produced statistics represents a comparison between the input signal 104 and the test signal 106. To that end, it is objective of some embodiments to apply a sliding three-dimensional (3D) window method to the matrix data structure 110 in order to produce the statistics of the input signal 104. For instance, the controller 100 is further configured to apply the sliding three-dimensional (3D) window method to the matrix data structure 110 (or the matrix data structure 110') to produce the statistics of the input signal 104 (or the test signal 106) with respect to the different rotated versions 108 (i.e. the rotated test signals), as explained in the detailed description of FIG. 1D-FIG. 1F.

In this disclosure, the 3D part of the name of the sliding three-dimensional (3D) window method refers to the ability of the window to simultaneously cover the two dimensional input signal and rotations of the test signal along the third dimension of the window. The name is used for clarity purpose and not as the limitation.

FIG. 1D illustrates a window 112 applied to the matrix data structure 110, according to some embodiments of the present disclosure. According to an embodiment, the sliding three-dimensional (3D) window determines a value of the statistics of the input signal 104 at a location (e.g. a location 114) in the input signal 104 by applying the window 112 (i.e. the shaded portion) at the location in the input signal 104 of the matrix data structure 110. The window 112 may be of configurable window size m. Further, the sliding three-dimensional (3D) window method moves the window 112 to a next location to determine the value of the statistics of the input signal 104 at the next location in the input signal 104 of the matrix data structure 110. In this way, the sliding three-dimensional window method iteratively moves the window 112 over the matrix data structure 110 from a current location (e.g. the location 114) in the matrix data structure 110 to a next location after determining a current value of the statistics of the input signal 104 at the current location. In other words, the sliding three-dimensional (3D) window method iteratively moves the window 112 over the matrix data structure 110 to determine, within the window 112, the value of the statistics for a segment 116 of the input signal 104 in the matrix data structure 110. The segment 116 may be a subsequence of the input signal 104 defined by the configurable window size m of the window 112.

As used herein, the current location may correspond to a time instance in the input signal 104 of the matrix data structure 110 for which the window 112 is applied. As used herein, the next location may correspond to any subsequent location to the current location. The 'sliding' part of the sliding three-dimensional (3D) window method may refer to that the sliding three-dimensional (3D) window method iteratively moves the window 112 over the matrix data structure 110 to determine the statistics of the input signal 104. The 'three-dimensional (3D) window' part of the sliding three-dimensional (3D) window method may refer to that the sliding three-dimensional (3D) window method determines the statistics for the time-series data (e.g. the input signal 104) within a window with respect to all other segments (e.g. the entire test signal 106) defined within the same window (e.g. the window 112). Accordingly, the sliding three-dimensional (3D) window method enables to determine the statistics for a segment of the input signal 104 with respect to the test signal 106 (i.e. the entire test signal) using a single window (i.e. the window 112).

As used herein, the statistics of the input signal 104 may correspond to 'matrix profile' of the input signal 104. The 'matrix profile' may also be time-series data. Further, the 'matrix profile' may be mathematically represented as $Z=[z_0, z_1, \ldots, z_{n-m}]$, where $Z[j]=z_j$ is the value of the statistics of the input signal 104 determined at location j (or $j^{th}$ segment of the input signal 104), j=0, 1, . . . , n−m. The $j^{th}$ segment of the input signal 104 may be mathematically represented as $Y_{j, \ldots, j+m-1} \equiv [y_j, y_{j+1}, \ldots, y_{j+m-1}]$.

Here for purpose of explanation, the window 112 of window size m=4 is considered. However, the window size may be any configurable size within or equal to length of the input signal 104. For instance, the window size of the window 112 may be mathematically defined as $1 \le m \le n$. Here for purpose of explanation, the window 112 starting at the location 114 (e.g. at an initial value $y_0$) of the input signal 104 for determining the value (e.g. $z_0$) of the statistics of the input signal 104 is considered. However, the window 112 may randomly start at any value (e.g. $y_0, y_1, \ldots, y_{n-m}$) of the input signal 104 for determining the corresponding values (e.g. $z_0, z_1, \ldots, z_{n-m}$) of the statistics of the input signal 104, respectively. For instance, the controller 100 determines the value (e.g. $z_0$) of the statistics of the input signal 104 at the location 114 by applying the sliding three-dimensional (3D) window method, as explained in the detailed description of FIG. 1E.

FIG. 1E illustrates the sliding three-dimensional (3D) window method for determining the statistics of the input signal 104, according to some embodiments of the present disclosure. FIG. 1E is explained in conjunction with FIG.

1D. Some embodiments are based on understanding that the different rotated versions 108 of the test signal 106 within the window 112 comprise invalid test signal segments 118 and valid test signal segments. As used herein, the invalid test signal segments 118 may correspond to rotated test signal segments that violate the monotonicity of time indices in the test signal 106. For instance, the rotated test signals $X^{(6)}$, $X^{(7)}$, and $X^{(8)}$ defined within the window 112 are considered to be the invalid test signal segments 118 for the window 112 at the location 114, because all the three rotated test signals $X^{(6)}$, $X^{(7)}$, and $X^{(8)}$ indicate, within the window 112, that the value $x_0$ of the test signal 106 follows the value $x_9$ of the test signal 106 with time, which is the violation of the monotonicity of the time indices defined in the test signal 106. The valid test signal segments may include the current segments of the test signals 106 excluding the invalid test signal segments 118.

To this end, in some embodiments, at step 120, the controller 100 applies the sliding three-dimensional (3D) window method to compute statistical observations (also referred to as local statistics) for a current segment (e.g. the segment 116) of the input signal 104 within the window 112 at a current location (e.g. the location 114) with respect to current segments of the test signal 106 within the window 112 at the current location. For instance, the current segments of the test signal 106 within the window 112 at the current location includes a current test signal segment (e.g. a segment comprising a time-series values of $x_0$, $x_1$, $x_2$, and $x_3$) defined by the window 112 and the different rotated versions 108 of the test signal 106 defined within the window 112. In other words, the controller 100 is configured to compute the statistical observations of the current segment of the input signal 104 within the window 112 at the current location with respect to all other segments within the window 112 at the current location. According to an embodiment, the statistical observations of the current segment of the input signal 104 at the current location include a difference between values of the current segment of the input signal 104 with values of each current segment of the test signal 106 defined within the window 112. In other words, the statistical observations of the current segment of the input signal 104 at the current location may include element-wise differences between the current segment of the input signal 104 and each current segment of the test signal 106 defined within the window 112. For instance, the statistical observations of the segment 116 of the input signal 104 within the window 112 at the location 114 with respect to the current test signal segment (e.g. $x_0, x_1, x_2, x_3$) defined within the window 112 may be mathematically computed as $\{|y_0-x_0|, |y_1-x_1|, |y_2-x_2|, |y_3-x_3|\}$. In this way, the controller 100 is configured to compute the absolute difference between the values of the current segment (e.g. the segment 116) of the input signal 104 with the values of each current segment of the test signal 106 defined within the window 112 for computing the statistical observations of the current segment of the input signal 104.

To this end, the statistical observations of the current segment of the input signal 104 may include valid statistical observations and invalid statistical observations. The valid statistical observations for the window 112 at the current location include a difference between the values of the current segment of the input signal 104 with the values of each current segment of the test signal 106 with monotonic time indices. In other words, the valid statistical observations for the window 112 at the current location include a difference between the values of the current segment of the input signal 104 with the values of each valid test signal segment defined within the window 112. The invalid statistical observations for the window 112 at the current location include a difference between the values of the current segment of the input signal 104 with the values of each invalid test signal segment defined within the window 112.

In some other embodiments, the controller 100 applies the sliding three-dimensional (3D) window method to compute the valid statistical observations for the current segment (e.g. the segment 116) of the input signal 104 within the window 112 at the current location (e.g. the location 114) with respect to the valid test signal segments defined within the window 112 at the current location by excluding the invalid test signal segments defined within the window 112 at the current location, since the test signal 106 is the time-series data and has monotonic time dependency.

At step 122, the controller 100 applies the sliding three-dimensional (3D) window method to determine a current value (e.g. the value $z_0$) of the statistics of the input signal 104 from the statistical observations of the current segment (e.g. the segment 116) of the input signal 104. According to an embodiment, the controller 100 is configured to determine the current value of the statistics of the input signal 104 from the statistical observations of the current segment (e.g. the segment 116) of the input signal 104 excluding the invalid statistical observations determined with respect to the current segments of the test signal 106 violating the monotonicity of the test signal 106. In other words, the controller 100 is configured to determine the current value of the statistics of the input signal 104 from the valid statistical observations of the current segment (e.g. the segment 116) of the input signal 104. For instance, the current value of the statistics of the input signal 104 may be mathematically determined as $$z_j \equiv \min_{0 \leq j' \leq n-m,} d(Y_{j,\ldots,j+m-1}, X_{j',\ldots,j'+m-1}).$$

The notation $d(Y_{j,\ldots,j+m-1}, X_{j',\ldots,j'+m-1})$ may be computed from the valid statistical observations of the current segment (e.g. the segment 116) of the input signal 104. For instance, the notation $d(Y_{j,\ldots,j+m-1}, X_{j',\ldots,j'+m-1})$ may be mathematically computed as $$d(Y_{j,\ldots,j+m-1}, X_{j',\ldots,j'+m-1}) = \max_{0 \leq k \leq m-1} |Y_{j+k} - X_{j'+k}|.$$

The notation $d(.,.)$ defines an unnormalized Euclidean distance (represented as $l_p$ ($1 \leq p \leq \infty$)). To this end, the statistics of the input signal 104 at location j is a distance between the $j^{th}$ subsequence of the input signal 104 and nearest-neighboring sequences in the test signal 106. In other words, the controller 100 computes the distance between the current segment (e.g. the segment 116) of the input signal 104 and each of the valid test signal segments defined within the window 112 for determining the current value of the statistics of the input signal 104 at the location j. For instance, the controller 100, for determining the current value (e.g. the value $z_j$) of the statistics of the input signal 104 at location j, computes element-wise distances between the segment $Y_{j,\ldots,j+m-1}$ and the valid test signal segments comprising $X_{j,\ldots,j+m-1}$ and $X_{j',\ldots,j'+m-1}^{(i)}$, $i \in \{i | i \in \mathbb{N}, 0 \leq i \leq n-2\} \setminus \{i | i \in \mathbb{N}, n-m-j-1 \leq i \leq n-j-1\}$, and determines a minimum among the computed distances. The statistics of the input signal 104 may be also referred to as global statistics of the input signal 104.

At step 124, the controller 100 applies the sliding three-dimensional (3D) window method to move the window 112 from the current location (e.g. the location 114) over the matrix data structure 110 to a next location. According to an embodiment, the controller 100 is configured to determine a value of a shift for moving the window 112 from the current location (e.g. the location 114) to the next location in the matrix data structure 110. In some embodiments, the value for moving the window 112 from the current location (e.g. the location 114) to the next location in the matrix data structure 110 may be equal to the difference in the circular shifts values between any two neighboring rotated test signals in the different rotated versions 108 of the test signal 106. In some other embodiments, the value for moving the window 112 from the current location (e.g. the location 114) to the next location in the matrix data structure 110 may be a predefined value.

Further, the controller 100 is configured to move the window 112 from the current location (e.g. the location 114) to a next location in the matrix data structure 110 based on the determined value of the shift. For instance, once the window 112 is moved to the next location in the matrix data structure 110, the window 112 at the next location is as illustrated in FIG. 1F.

Figure 1F:
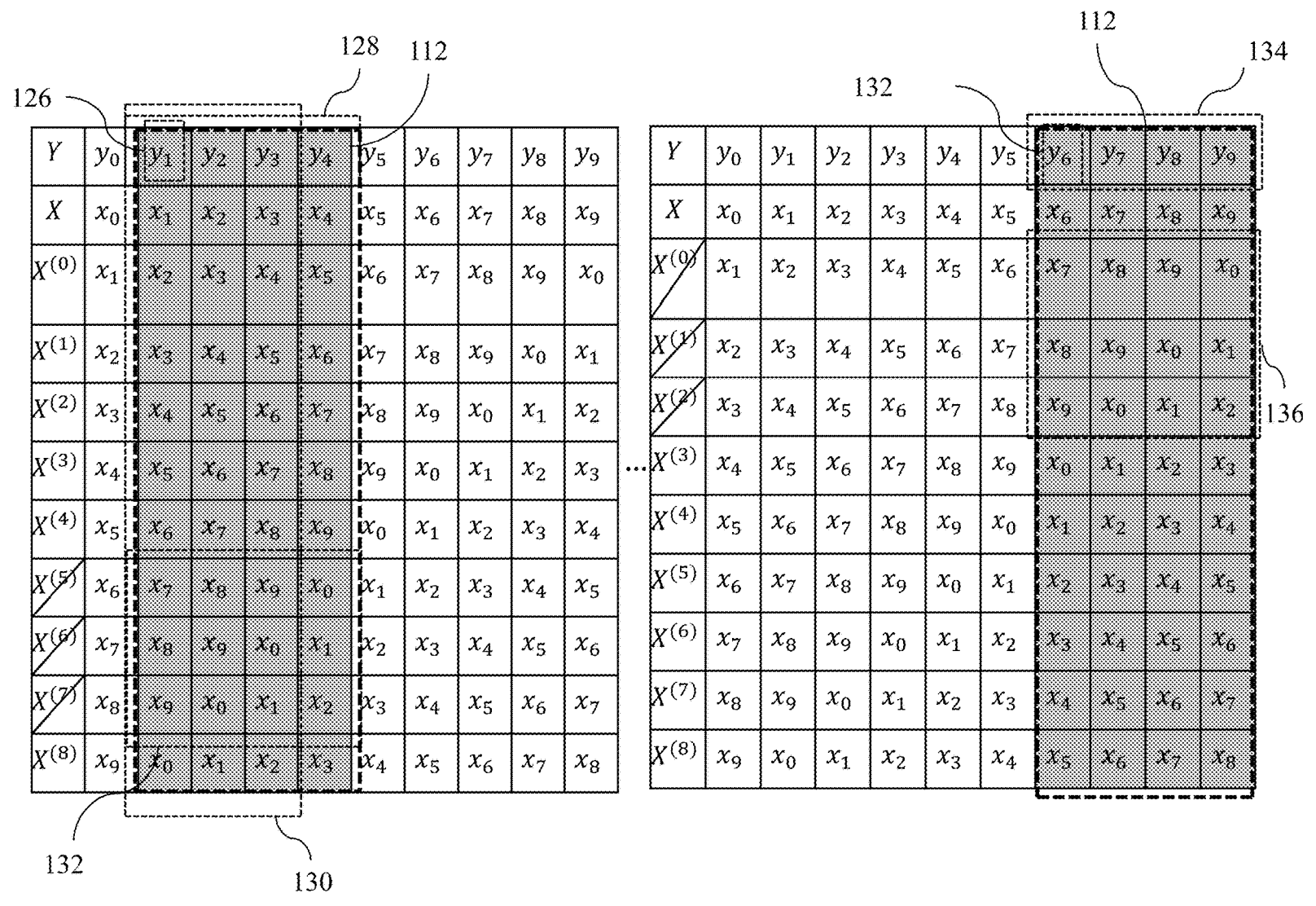

FIG. 1F illustrates a schematic showing iterative process of the sliding three-dimensional (3D) window method, according to some embodiments of the present disclosure. FIG. 1F is explained in conjunction with FIG. 1E. Once the window 112 is moved to the next location (e.g. a location 126) in the matrix data structure 110, the controller 100 loops back to the step 120. At step 120, the controller 100 applies the sliding three-dimensional (3D) window method to compute the statistical observations of the current segment (e.g. a segment 128) of the input signal 104 within the window 112 at the current location (e.g. the location 126) with respect to the current segments of the test signal 106 within the window 112 at the current location. Some embodiments are based on recognition that the statistical observations of the current segment (e.g. the segment 128) of the input signal 104 within the window 112 at the current location (e.g. the location 126) include some previously computed statistical observations for the window 112 at a pervious location (e.g. the location 114). For instance, the previously computed statistical observations for the current segment (e.g. the segment 128) of the input signal 104 within the window 112 at the current location (e.g. the location 126) includes the statistical observations computed for columns 130 at the pervious location (e.g. the location 114). The columns 130 may be an overlapping region between the window 112 at the current location (e.g. the location 126) and the window 112 at the previous location (e.g. the location 114). To that end, it is objective of some embodiments to use at least some corresponding statistical observations determined for the window 112 at the pervious location (e.g. the location 114), while computing the statistical observations of the segment 128 of the input signal 104 within the window 112 at the location 126. Accordingly, the controller 100 optimizes the computation of the statistical observations for determining the statistics of the input signal 104.

Some embodiments are based on realization that the invalid test signal segments for the window 112 at one location in the matrix data structure 110 is different from the window 112 at another location in the matrix data structure 110. For example, the invalid segments 118 for the window 112 at location 114 include the rotated test signals $X^{(6)}$, $X^{(7)}$, and $X^{(8)}$; and invalid segments 132 for the window 112 at location 126 include the rotated test signals $X^{(5)}$, $X^{(6)}$, and $X^{(7)}$. So, to use at least some corresponding statistical observations determined for the window 112 at the pervious location, some embodiments compute, at step 120, the statistical observations that include both the valid statistical observations and the invalid statistical observations.

Further, at step 122, the controller 100 applies the sliding three-dimensional (3D) window method to determine the current value (e.g. the value $z_1$) of the statistics of the input signal 104 from the statistical observations of the current segment of the input signal 104 excluding the invalid statistical observations determined with respect to the current segments of the test signal 106 violating the monotonicity of the test signal 106. For the window 112 at location 126, the invalid test signal segments 132 may include the rotated test signals $X^{(5)}$, $X^{(6)}$, and $X^{(7)}$ defined within the window 112, because the rotated test signals $X^{(5)}$, $X^{(6)}$, and $X^{(7)}$ defined within the window 112 violate the monotonicity of the time indices defined in the test signal 106.

At step 124, the controller 100 applies the sliding three-dimensional (3D) window method to move the window 112 from the current location (e.g. the location 126) to the next location in the matrix data structure 110 as explained above in the detailed description of FIG. 1E.

In this way, the controller 100 applies the sliding three-dimensional (3D) window method to iteratively move the window 112 from the current location (e.g. the location 126) to the next location over the matrix data structure 110 to produce the statistics of the input signal 104 until a termination condition. In some embodiments, the termination condition may be a condition where the window 112 is at a location having a value of $y_{n-m}$ of the input signal 104 (e.g. a location 132). In some other embodiments, the termination condition may be a condition where a window (e.g. a window of window size m=1) is at a location having a value of $y_{n-1}$ of the input signal 104. For the window 112 at the location 132, invalid test signal segments 136 may include the rotated test signals $X^{(0)}$, $X^{(1)}$, and $X^{(2)}$ defined within the window 112, because the rotated test signals $X^{(0)}$, $X^{(1)}$, and $X^{(2)}$ defined within the window 112 violate the monotonicity of the time indices defined in the test signal 106. For the window 112 at the location 132, the controller 100 computes the current value (e.g. the value $z_{n-m}$) of the statistics of the input signal 104 similarly as explained for the case where the window 112 at the location 126. To this end, the controller 100 produces the statistics (e.g. $Z=[z_0, z_1, \ldots, z_{n-m}]$) of the input signal 104 with respect to the test signal 106. Thus produced statistics of the input signal 104 may be a time-series signal having the values of the statistics of the input signal 104.

Further, the controller 100 is configured to control the operation of the system 102 according to the statistics of the input signal 104. For instance, the controller 100 may compare the statistics of the input signal 104 with a threshold value; and determine an anomaly in the operation of the system 102, if the statistics of the input signal is greater than the threshold value.

Here for purpose of explanation, in FIGS. 1D-1F, the window 112 applied over the matrix data structure 110 is considered. However, the window 112 may be applied over the matrix data structure 110'. In this case, the statistics ('matrix profile') of the test signal 106 equivalent to the input signal 104 may be mathematically represented as $Z=[z_0, z_1, \ldots, z_{n-m}]$, where $Z[j]=z_j$ is the value of the statistics of the test signal 106 computed for $j^{th}$ segment of the test signal 106, j=0, 1, . . . , n−m. The value (e.g. $z_j$) of the test signal 106 may be mathematically determined as $$z_j \equiv \min_{0 \le j' \le n-m, j' \ne j} d(X_{j,\ldots,j+m-1}, X_{j',\ldots,j'+m-1}).$$

To this end, the statistics of the test signal 106 at location j is a distance between the $j^{th}$ subsequence of the test signal 106 and its nearest-neighboring sequence in the test signal 106. In other words, the controller 100 applies the sliding 3D window method such that the sliding 3D window method determines the statistics of the test signal 106 (i.e. the input signal 104) with respect to itself by comparing different segments of the test signal 106 with other segments of the test signal 106.

Here for the purpose of explanation, in FIGS. 1D-1F, the window 112 of same window size (e.g. m=4) at different locations (e.g. at the location 114 and at the location 126) is considered. However, in some embodiments, the window size may vary from one location to another location in the matrix data structure 110. For instance, the window 112 applied by the sliding three-dimensional (3D) window method at two different locations in the matrix data structure 110 may have two different window sizes. Some embodiments are based on understanding that an accurate window size m of the window 112 to capture 'true essence' of the input signal 104 or to capture 'true essence' of the input signal 104 with respect to the test signal 106 is unknown. As used herein, the 'true essence' of the input signal 104 may be intrinsic characteristics of a segment of the input signal 104 with respect to other segments of the input signal 104. As used herein, the 'true essence' of the input signal 104 with respect to the test signal 106 may be extrinsic characteristics of a segment of the input signal 104 with respect to the test signal 106. To this end, it is objective of some embodiments to apply the sliding three-dimensional (3D) window method to produce multidimensional statistics of the input signal 104 by applying multiple windows of different window sizes at each location in the input signal 104 of the matrix data structure 110. For instance, the multiple windows of different window sizes at one particular location of the input signal 104 are as illustrated in FIG. 2.

FIG. 2 illustrates a schematic showing the multiple windows of different window sizes applied by the sliding three-dimensional (3D) window method, according to some embodiments of the present disclosure. According to an embodiment, the controller 100 applies the sliding three-dimensional (3D) window method to apply multiple windows of different window sizes at each location in the input signal 104 of the matrix data structure 110. For instance, the controller 100 applies the sliding three-dimensional (3D) window method to apply a first window 200 of window size m=3, a second window 202 of window size m=4, and a third window 204 of window size m=5 at a location 206 in the input signal 104 of the matrix data structure 110. Since each window of the multiple windows 200, 202, and 204 is of different window size, the value of the statistics of the input signal 104 determined by the controller 100 at each location of the input signal 104 using each window is different. In other words, the controller 100 determines multiple different values of the statistics of the input signal 104 for each location in the input signal 104 of the matrix data structure 110 by applying the multiple windows 200, 202, and 204 at each location in the input signal 104. These multiple different values of the statistics of the input signal 104 determined for the entire input signal 104 may be referred to as the multidimensional statistics of the input signal 104. According to an embodiment, while determining the value of the statistics of the input signal 104 at the location 206 using one of the windows 200, 202, and 204, the controller 100 may be configured to reuse at least some statistical observations that were previously computed for an overlapping window at the location 206. The overlapping windows for the window 200 at the location 206 may be the window 202 and the window 204, because the window 200 has an overlapping region 208 with the window 202 and the window 204. The overlapping windows for the window 202 may be the window 200 and the window 204, as the window 202 has the overlapping region 208 with the window 200 and further the window 202 has an overlapping region that is equivalent to the window 202 with the window 204. The overlapping windows for the window 204 may be the window 200 and the window 202, as the window 204 has the overlapping region 208 with the window 200 and further the window 204 has the overlapping region that is equivalent to the window 202 with the window 202.

As illustrated in FIG. 2, the window 200 may be of a different case in comparison with the windows 202 and 204, apart from the window size m. For instance, the window 200 is used to determine the value of the statistics of the input signal 104 for a centered location in a first row of the window 200. However, the windows 202 and 204 are used to determine the value of the statistics of the input signal 104 for a starting location within the windows 202 and 204.

Figure 3:
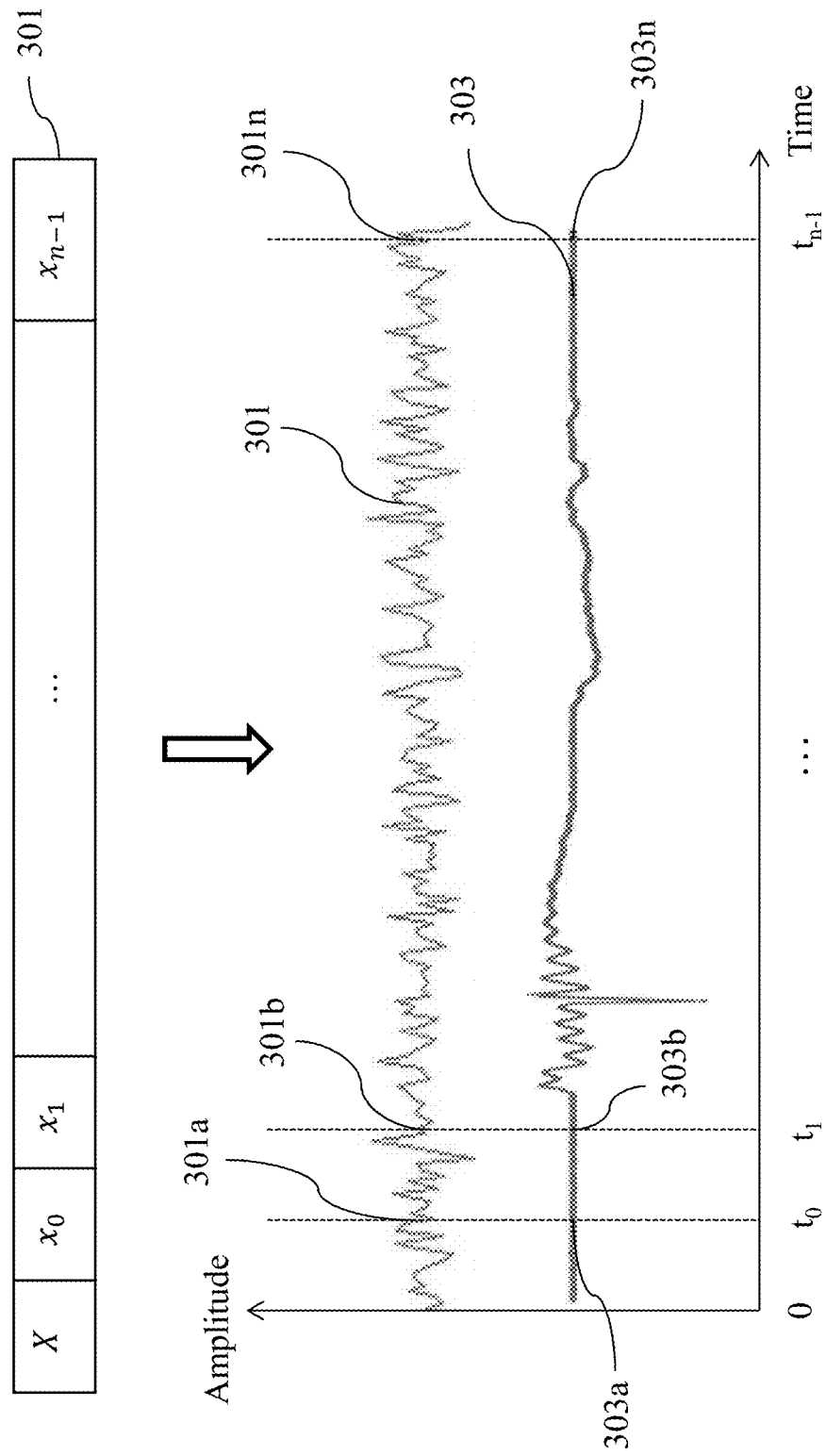
FIG. 3 illustrates a schematic showing time-series data, according to some embodiments of the present disclosure.

FIG. 3 illustrates a schematic showing time-series data 301, according to some embodiments of the present disclosure. The time-series data 301 may correspond to at least one of the input signal 104 and the test signal 106. The time-series data 301 is a series of values $x_0, x_1, \ldots, x_{n-1}$ measured in a sequence with time. In some embodiments, the time-series data 301 may be a single dimension signal having the values (e.g. $x_0, x_1, \ldots, x_{n-1}$) measured from an operation of an actuator of the system 102. For instance, the time-series data 301 may have values $x_0, x_1, \ldots, x_{n-1}$ that correspond to a value 301a, a value 301b, . . . , a value 301n, respectively. The values 301a, 301b, . . . , and 301n may be values of the signal 301 sampled at time instance $t_0, t_1, \ldots, t_{n-1}$, respectively. The signal 301 may be a signal collected from the operation of the actuator of the system 102. In an embodiment, the controller 100 determines the value of the statistics of the time-series data 301 for each location (having a single value) in the time-series data 301. In this embodiment, mapping between the value in the time-series data 301 and the value of the statistics is one-to-one mapping. In another embodiment, the controller 100 determines the multiple different values of the statistics (i.e. the multidimensional statistics) of the time-series data 301 for each location (having a single value) in the time-series data 301. In this embodiment, mapping between the value in the time-series data 301 and the multiple different values of the statistics is one-to-many mapping.

In some other embodiments, the time-series data 301 may be a multidimensional signal having the values (e.g. $x_0, x_1, \ldots, x_{n-1}$) measured from operations of different actuators of the system 102. For instance, the time-series data 301 may have values $x_0, x_1, \ldots, x_{n-1}$ that comprises a value 301a and a value 303a, a value 301b and a value 303b, . . . , a value 301n and a value 303n, respectively. The values 301a, 301b, . . . , and 301n may be values of the signal 301 sampled at time instance $t_0, t_1, \ldots, t_{n-1}$, respectively. The values 303a, 303b, . . . , and 303n may be values of the signal 303 sampled at time instance $t_0, t_1, \ldots, t_{n-1}$, respectively. The signals 301 and 303 may be signals collected from the operations of the different actuator of the system 102. In an embodiment, the controller 100 determines the value of the statistics of the time-series data 301 for each location (having multiple values) in the time-series data 301. In this embodiment, mapping between the multiple values in the time-series data 301 and the value of the statistics is many-to-one mapping. In another embodiment, the controller 100 determines the multiple different values of the statistics (i.e. the multidimensional statistics) of the time-series data 301 for each location (having multiple values) in the time-series data 301. In this embodiment, mapping between the multiple values in the time-series data 301 and the multiple different values of the statistics is many-to-many mapping.

FIG. 4A illustrates an overview of an algorithm for computing statistics of the input signal 104, according to some embodiments of the present disclosure. Some embodiments are based on understanding that the statistics are determined by a subroutine that computes maximum values of the window applied by the sliding three-dimensional window for the given time-series data (e.g. the input signal 104) and the given window size m. To this end, some embodiments apply a brute-force approach that is configured to search a maximum value for each and every window of the window size in, leading to a time complexity in an order of $O(m(n-m+1))=O(mn)$, which is dependent on the window size m. Since the time complexity of the brute-force approach is dependent on the window size m, time required to compute the statistics (using the brute-force approach) would proportionally increase with respect to the window size m. To this end, it is objective of some embodiments to compute statistics of the input signal using at least one of a double-ended queue method or a segment tree method such that the time complexity is independent of the window size m and allows to compute the statistics of the input signal in less amount time, in comparison to the brute-force approach. For instance, the algorithm (i.e. Algorithm 1) executed by the controller 100 for computing the statistics of the input signal, using least one of the double-ended queue method or the segment tree method is as illustrated in FIG. 4A.

The algorithm 1 is executed on the controller 100 to execute a plurality of operations. Based on the execution of the the Algorithm 1, the controller 100 receives time-series data (X), a window size (m), and an argument ('option'). Algorithm 1 considers that the input signal and the test signal are equal to the time-series data (X). The argument 'option' is used to select at least one of the double-ended queue method ("deque") or the segment tree method ("segtree"). Further, the controller 100 determines a length (n) of the time-series data (hereinafter, the time-series data is referred to as the input signal (X)), and initializes an array of length n−m+1 for computing the statistics of the input signal. The controller 100 computes element-wise distances ("eleDist") between the input signal and the different rotated versions of the input signal. Further, an algorithm for computing the element-wise distances is as illustrated in FIG. 4B.

FIG. 4B illustrates an algorithm (Algorithm 1.1) for computing the element-wise distances, according to some embodiments of the present disclosure. The Algorithm 1.1 is executed on the controller 100 to perform a plurality of operations in order to compute the element-wise distances. In particular, after executing the Algorithm 1.1, the controller 100, at first, receives the input signal (X) and variable i. The variable i indicates an i-th rotated version of the input signal. Further, the controller 100 determines the length of the input signal and produces the i-th rotated version of the input signal. The controller 100 computes the element-wise distances between the input signal and the i-th rotated version of the input signal. Further, the controller 100 returns an array 'eleDist' comprising the element-wise distances between the input signal and the i-th rotated version of the input signal. The array 'eleDist' may have a length that is similar to the length of the input signal.

Referring to FIG. 4A, the Algorithm 1 configures the controller 100 to check if the option is equal to "deque". If the option is equal to "deque", the Algorithm 1 configures the controller 100 to apply the double-ended queue method to determine the maximum values of the window applied by the sliding three-dimensional window method. Further, an algorithm for determining, using the double-ended queue method, the maximum values of the window applied by the sliding three-dimensional window method is as illustrated in FIG. 4C.

FIG. 4C illustrates an algorithm (Algorithm 1.2) for determining the maximum values of the window applied by the sliding three-dimensional window method, using the double-ended queue method, according to some embodiments of the present disclosure. The Algorithm 1.2 is executed to perform a plurality of operations in order to determine the maximum values of the window. After the execution of the Algorithm 1.2, the controller 100 receives the input signal (X) and the window size (m) and determines the length of the input signal. Further, the controller 100 checks if the window size (m) is equal to one and returns the input signal (X), if the window size (m) is equal to one. The controller 100 initializes an empty double-ended queue (Q) and initializes an empty vector ("slidMax"). Further, the controller 100 removes time indices of values of the input signal that do not correspond to the window applied by the sliding three-dimensional window method at the current location. The controller 100 removes, from the double-ended queue (Q), the time indices of all values of the input signal that are smaller than a current value (X[l]) of the input signal. Further, the controller 100 appends a variable l to rightmost of the double-ended queue (Q) and appends a value X[Q [0]] of the input signal to rightmost of the vector ("slidMax"). In this way, each value of the input signal may be added into the double-ended queue (Q) once and removed from the double-ended queue (Q), leading to a time complexity of O(n), which is independent of the window size m. Further, the controller 100 returns the vector ("slidMax") comprising the maximum values of the window applied by the sliding three-dimensional window method.

Referring to FIG. 4A, the Algorithm 1, checks if the 'option' is equal to "segtree". If the 'option' is equal to "segtree", the controller 100 constructs a segment tree. For instance, an algorithm for constructing the segment tree is as illustrated in FIG. 4D.

FIG. 4D illustrates an algorithm (Algorithm 1.3.1) for constructing the segment tree, according to some embodiments of the present disclosure. The Algorithm 1.3.1 includes a set of instructions which are executed on the controller to construct the segment tree. After the Algorithm 1.3.1 is executed, the controller 100 receives the input signal (X) and determines the length (n) of the input signal. Further, the controller 100 initializes a new zero array ("ST") with length equal to 2n, and copies the input signal to a second half of the array ("ST") to construct the segment tree ('ST').

Referring to FIG. 4A, the Algorithm 1 configures the controller 100 to apply the segment tree method to determine the maximum values of the window applied by the sliding three-dimensional window method. Further, an algorithm for determining, using the segment tree method, the maximum values of the window applied by the sliding three-dimensional window method is as illustrated in FIG. 4E.

FIG. 4E illustrates an algorithm (Algorithm 1.3.2) for determining the maximum values of the window applied by the sliding three-dimensional window method, using the segment tree method, according to some embodiments of the present disclosure. The Algorithm 1.3.2 includes a set of instructions which are executed on the controller 100 in order to determine the maximum values of the window. When the Algorithm 1.3.2 is executed on the controller 100, the controller 100 receives the constructed segment tree ("ST") and the window size (m). The controller 100 determines the length of the input signal by dividing the length of the segment tree ("ST") by a value of 2. The controller 100 initializes a new empty vector ("slidMax") and computes a range maximum value ("nn") based on the segment tree ("ST") and the window size m. Further, the controller 100 appends the range maximum value ("nn") to the vector ("slidMax"). In this way, the range maximum value ("rm") may be iteratively computed and the range maximum value ("rm") is iteratively appended to the vector ("slidMax"), for j=0,1, . . . , n–m. Further, the controller 100 returns the vector ("slidMax") comprising the maximum values of the window applied by the sliding three-dimensional window method. An algorithm for computing the range maximum value ("nn") based on the segment tree ("ST") and the window size m is as illustrated in FIG. 4F.

FIG. 4F illustrates an algorithm (Algorithm 1.3.3) for computing the range maximum value ("rm") based on the segment tree ("ST") and the window size m, according to some embodiments of the present disclosure. The Algorithm 1.3.3 is executed on the controller 100. After the execution of the Algorithm 1.3.3, the controller 100 receives the constructed segment tree ("ST"), a first variable ("left"="j"), a second variable ("right"="j+m"). Further, the controller 100 determines the length of the input signal by dividing the length (n) of the segment tree ("ST") by the value of 2 to compute the first variable as left→left+n, the second variable as right→right+n. The controller 100 initializes a floating number ("max"). For instance, the floating number may be initialized as small as "−1.0×10⁶". Further, the controller 100 computes a maximum value and update the maximum value into the floating number upon satisfying one or more conditions to return the floating number ("max").

Referring to 4A, the Algorithm 1 configures the controller 100 to compute the current value (i.e. MP[j]=$z_j$) of the statistics of the input signal provided the current value (MP[j]) is always up-till-now minimum $l_p$ distance for the window applied at location j. The Algorithm 1 also configures the controller 100 to compute the current value of the statistics for the segment of the input signal with respect to each of rotated versions defined within the window and that do not violate the monotonicity of the time indices of the input signal. Accordingly, the Algorithm 1 configures the controller 100 to return the MP[j] for the window located at location j.

In this way, the controller 100 is configured to determine the statistics of the input signal using at least one of the double-ended queue method or the segment tree method. Based on experimentation, the time complexity is determined as order of $O(n^2)$, when the double-ended queue method is applied. Based on experimentation, the time complexity is determined as order of $O(n^2 \log n)$, when the segment tree method is applied. In both the cases, the time complexity is independent of the window size m. Accordingly, the controller 100 that uses at least one of the sliding three-dimensional window method or the segment tree method computes the statistics of the input signal in less amount of time, in comparison to a controller that uses the brute-force approach for computing the statistics of the input signal. Further, the controller 100 is configured to use the computed statistics of the input signal to control the operation of the system 102. For instance, the controller 100 uses the computed statistics of the input signal to control the operation of the system 102 as explained in the detailed description of FIGS. 5-8.

Figure 5:
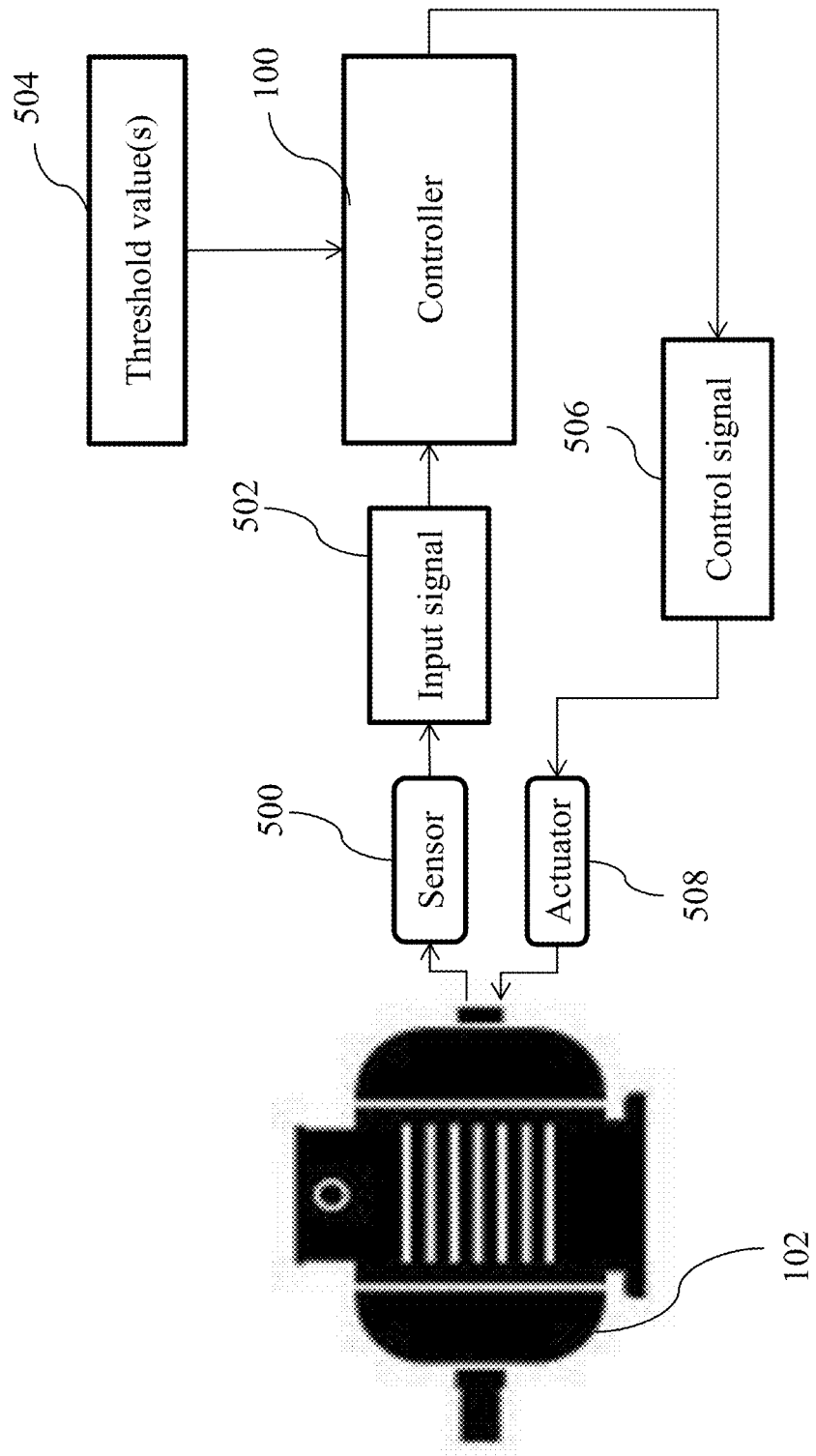
FIG. 5 illustrates an environment for controlling the system using the controller, according to some embodiments of the present disclosure.

FIG. 5 illustrates an environment for controlling the system 102 using the controller 100, according to some embodiments of the present disclosure. In this example, the system 102 is a motor. The system 102 may include various sensors for monitoring an operation of the motor. According to an embodiment, the system 102 includes a sensor 500 (e.g. a temperature sensor) to measure a temperature of the system 102. The sensor 500 records the temperature of the system 102 as the time series data. According to an embodiment, the controller 100 receives the time series data indicating the temperature of the system 102 as an input signal 502. In this example embodiment, a test signal (e.g. the test signal 106) and the input signal 502 are same. In other words, the test signal may be a copy of the input signal 502. To that end, the controller 100 determines the statistics of the input signal 502 with respect to itself by comparing different segments of the input signal 502 with other segments of the input signal 502 as explained in the detailed description of FIGS. 1A-1F.

The controller 100 is further configured to compare the statistics of the input signal 502 with at least one threshold value 504 to detect an anomaly in the statistics of the input signal 502. In some embodiments, the at least one threshold value 504 may be a temperature value (or statistics of the temperature value) that is indicative of normal operating temperature of the system 102. To this end, the controller 100 determines whether the statistics of the input signal 502 is greater than the threshold value to detect the anomaly in the statistics of the input signal 502. In some other embodiments, the at least one threshold value 504 may be a range of values indicating a normal operating temperature range of the system 102. To this end, the controller 100 checks whether the statistics of the input signal 502 is within the range of values to detect the anomaly in the statistics of the input signal 502. Furthermore, in some embodiments, the controller 100 may be configured to determine a control signal 506 for an actuator 508 to bring the motor to the normal operating temperature, in response to detecting the anomaly in the statistics of the input signal 502. For example, the controller 100 may generate a control signal to initiate an external cooling system (e.g., a fan) associated with the motor to bring the motor to the normal operating temperature. In some other embodiments, the controller 100 may be configured to determine the control signal 506 to stop the operation of the motor, in response to detecting the anomaly in the statistics of the input signal 502. To that end, the motor may stop the operation of the motor or operate with the normal operating temperature, when the anomaly is detected.

Figure 6:
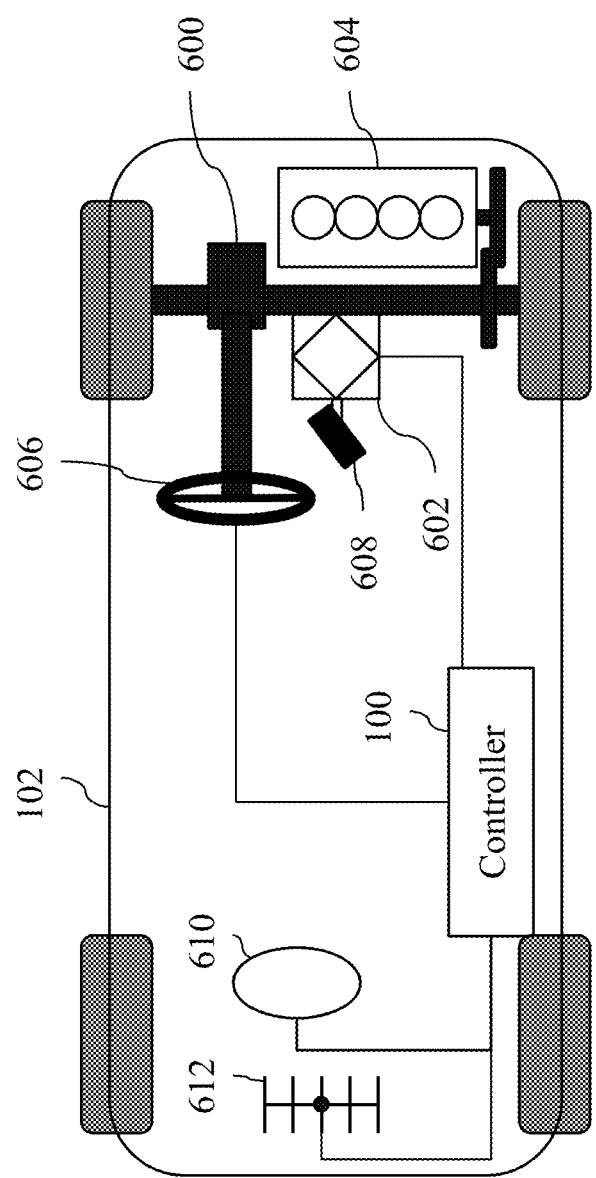
FIG. 6 illustrates an environment for controlling the system using the controller, according to some other embodiments of the present disclosure.

FIG. 6 illustrates an environment for controlling the system 102 using the controller 100, according to some other embodiments of the present disclosure. In this example, the system 102 is a vehicle. As used herein, the vehicle may be any type of wheeled vehicle, such as a passenger car, bus, or rover. Also, the vehicle may be an autonomous or semiautonomous vehicle. According to an embodiment, the controller 100 is configured to control a motion (i.e. operation) of the vehicle. Examples of the motion include lateral motion of the vehicle controlled by a steering system 600 of the vehicle and a braking system 602 of the vehicle. In an embodiment, the steering system 600 and the braking system 602 are controlled by the controller 100. Additionally or alternatively, the steering system 600 and the braking system 602 may be controlled by a driver of the vehicle.

The vehicle may also include an engine 604, which may be controlled by the controller 100 or by other components of the vehicle. Additionally, the vehicle may be equipped with a transceiver 612 for enabling communication capabilities of the controller 100 through wired or wireless communication channels. The vehicle may also include one or more sensors 610 to sense motion quantities and internal status of the vehicle. Examples of the sensors 610 include global positioning system (GPS), accelerometers, inertial measurement units, gyroscopes, shaft rotational sensors, torque sensors, deflection sensors, pressure sensor, and flow sensors. The one or more sensors 610 may be associated with different actuators of the vehicle. For instance, the actuators of the vehicle may include a steering wheel 606 associated with the steering system 600, a brake 608 associated with the braking system 602, and the like. The one or more sensors 610 may measure at least one of a physical variable of the steering system 600, a physical variable of the braking system 602, or a combination thereof, as time-series data. For instance, the physical variable of the steering system 600 may be a steering angle associated with the steering wheel 606 and the like. For instance, the physical variable of the braking system 602 may be a brake torque associated with the brake 608 and the like. The physical variable of the steering system 600 may be used to control rotation of the vehicle and the physical variable of the braking system 602 may be used to control acceleration of the vehicle, while the vehicle is under motion.

According to an embodiment, the controller 100 is configured to receive the time series data an input signal (e.g. the input signal 104). When the time series data corresponds to at least one of the physical variable of the steering system 600 or the physical variable of the braking system 602, the input signal is single dimension signal (e.g. a Univariate Time Series (UTS) signal). When the time series data corresponds to a combination of the physical variable of the steering system 600 and the physical variable of the braking system 602, the input signal is the multidimensional signal (e.g. a Multivariate Time Series (MTS) signal). Further, the controller 100 is configured to produce the statistics of the input signal as explained in the detailed description of FIG. 1A-1F.

Furthermore, the controller 100 is configured to compare the statistics of the input signal with statistics of raw data. For instance, the statistics of the raw data may include statistics for normal operation of the steering system 600 and the braking system 602 in lane maintenance application or the like. Furthermore, the controller 100 is configured to determine constraints (e.g. steering angle constraints, acceleration constraints, and the like) for lane maintenance or like, based on the comparison between the statistics of the input signal and the statistics of the raw data. Furthermore, the controller 100 is configured to determine control commands (e.g. the steering angle, the brake torque, and the like) for the actuators (e.g. the steering wheel 606, the brake 608, and the like) of the vehicle subjected to the determined constraints. Upon receiving the control commands from the controller 100, the actuators of the vehicle ensure maintaining a lane on a roadway.

Figure 7:
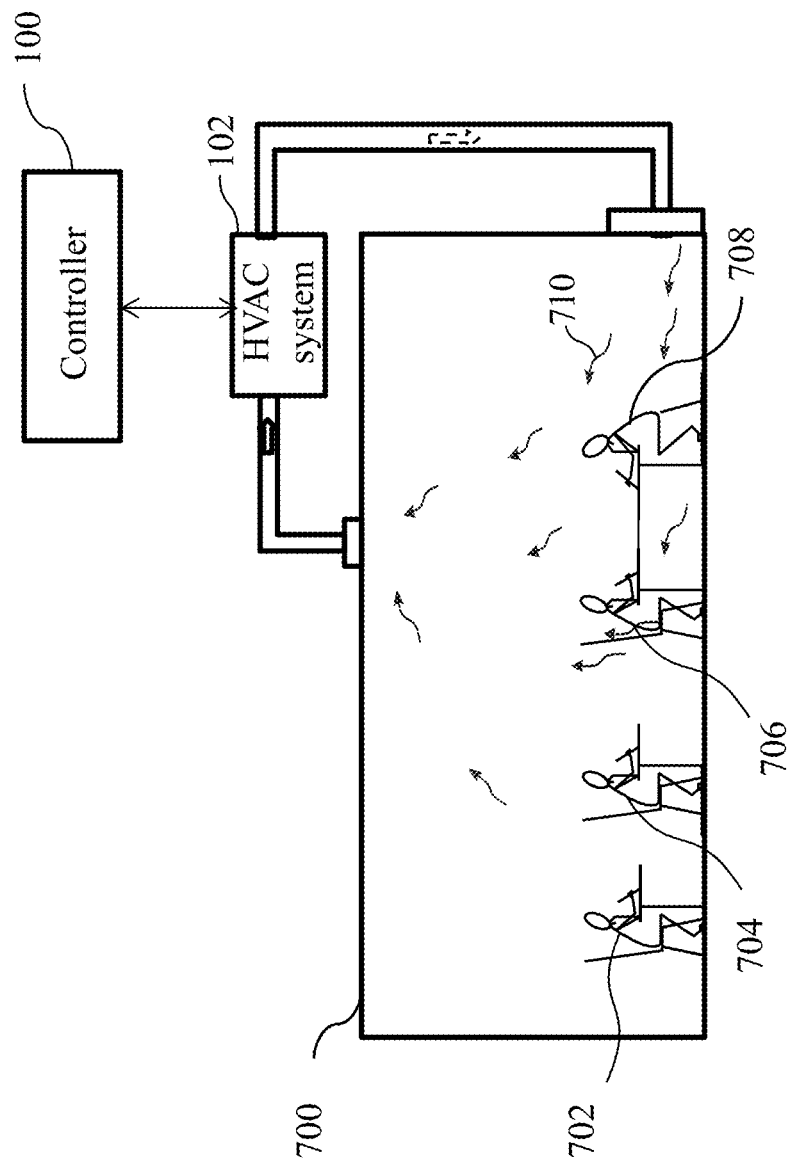
FIG. 7 illustrates an environment for controlling the operation of the system using the controller, according to yet some other embodiments of the present disclosure.

FIG. 7 illustrates an environment for controlling the operation of the system 102 using the controller 100, according to yet some other embodiments of the present disclosure. In this example, the system 102 is an HVAC system. The "HVAC" system refers to any heating, ventilating, and air-conditioning (HVAC) system implementing a vapor compression cycle. The HVAC systems span a very broad set of systems, ranging from systems which supply only outdoor air to occupants of a building, to systems which only control temperature of a building, or to systems which control the temperature and humidity.

The HVAC system is arranged to condition a room 700. The room 700 is occupied by occupants 702, 704, 706 and 708. Arrows 710 represent air supplied by the HVAC system to condition the room 700. The controller 100 is configured to receive an input signal (e.g. the input signal 104) for a first time period (also referred to as a first operation cycle). For instance, the input signal is indicative of an operational parameter of the HVAC system for the first time period (say, twenty four hours). Example of the operational parameters may include a position of an expansion valve of the HVAC system, a speed of a compressor of the HVAC system, a speed of an indoor fan of the HVAC system, a speed of an outdoor fan of the HVAC system, and the like. The controller 100 is configured to produce statistics for the input signal received from the HVAC system as explained in the detailed description of FIGS. 1A-1F. The controller 100 is further configured to store statistics of multidimensional time series data including operational parameters that correspond to optimal power consumption of the HVAC system.

Furthermore, the controller 100 is configured to determine an anomaly in the statistics of the input signal by comparing the statistics of the input signal with the statistics of the multidimensional time series data. In this example, the anomaly in the statistics of the input signal may be variations in the operational parameter that lead to a deviation from the optimal power consumption. The controller 100 is further configured to control, based on the determined anomaly, the system 102 for a second time period (also referred to as a second operation cycle) of say next twenty four hours such that the system 102 operates at the optimal power consumption in the second time period. For controlling the system 102 to operate at the optimal power consumption, the controller 100 may determine a time instance or duration of time for which the anomaly is determined in the first time period; and control the operational parameters at the determined time instance and duration of time in the second time period. In this way, the controller 100 is configured to determine the statistics of the input signal for one period of time and adjust the operation of the system 102 for another period of time.

Figure 8:
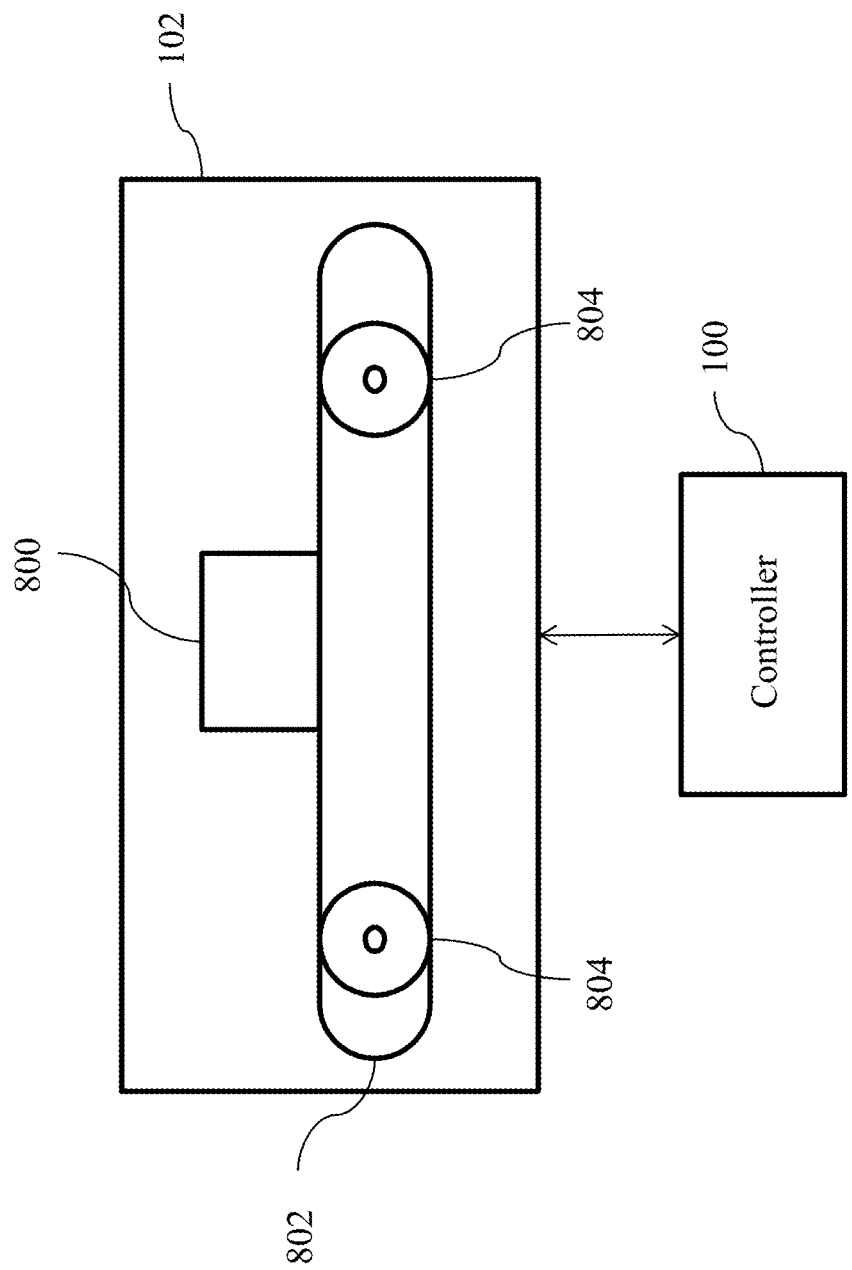
FIG. 8 illustrates an environment for controlling the operation of the system using the controller, according to yet some other embodiments of the present disclosure.

FIG. 8 illustrates an environment for controlling the system 102 using the controller 100, according to yet some other embodiments of the present disclosure. In this example, the system 102 is a conveyor belt system. The operation of the conveyor belt system may include moving a mass 800 from a first position to a second position. The first position and the second position are two different locations. The conveyor belt system 102 may include a conveyor belt 802 and at least two pulleys 804. Further, the conveyor belt system 102 may include a motor (e.g. a servo motor). At least one of the two pulleys 804 may be connected to a motor to execute the operation of the system 102. For instance, the motor may configure the pulleys 804 to rotate at a predefined speed to move the mass 800 from the first position to the second position. Additionally, the system 102 may include one or more sensor to measure the speed of the pulleys 804 (e.g. a speed of the motor) and the like. The one or more sensors may record the speed of the pulleys 804 as the time-series data. According to an embodiment, the controller 100 receives the time-series data indicating the speed of the pulleys 804 as the input signal. Further, the controller 100 is configured to produce the statistics for the input signal as explained in the detailed description of FIGS. 1A-1F.

According to some embodiments, the controller 100 may include a predictive model, which is configured to relate the produced statistics of the input signal to an expected time of failure of the system 102 (also referred to as Remaining Useful Life (RUL)). According to an embodiment, the predictive model may be a pre-trained machine learning model. Further, in some embodiments, the predictive model may be configured to output a first notification, based on the expected time of the failure of the system 102. The first notification may include a first message indicating to fix the system 102 or a second message indicating to allow the system 102 to run. Based on the first notification, the controller 101 may be configured to stop or allow the system 102 to operate.

In some other embodiments, the predictive model may be configured to output a second notification, based on the expected time of the failure of the system 102. For instance, the second notification may include a message indicating to limit the speed of the motor. Based on the second notification, the controller 101 may be configured to determine constraints (e.g. speed constraints) to limit the speed of the motor. In this way, the controller 100 is configured to control the system 102.

Figure 9:
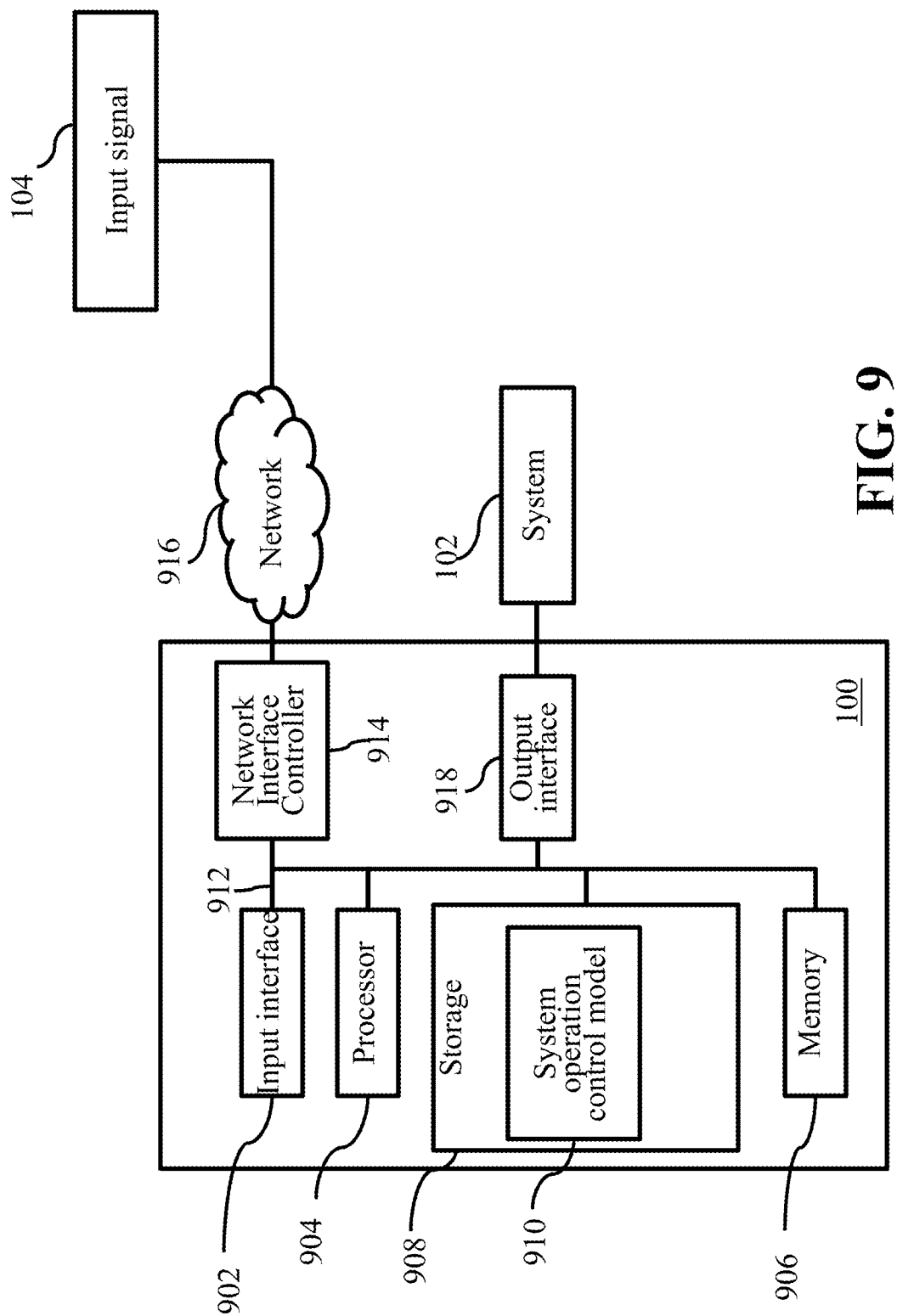
FIG. 9 shows an overall block diagram of the controller for controlling the system, according to some embodiments of the present disclosure.

An overall block diagram of the controller 100 is shown and explained in FIG. 9.

FIG. 9 shows an overall block diagram of the controller 100 for controlling the system 102, according to some embodiments of the present disclosure. The controller 100 may have a number of interfaces connecting the controller 100 with other systems and devices. For example, a network interface controller (NIC) 914 is adapted to connect the controller 100, through a bus 912, to a network 916. Through the network 916, either wirelessly or through wires, the controller 100 may receive the input signal 104. Additionally or alternatively, the input signal 104 may be received via an input interface 902.

The controller 100 includes a processor 904 configured to execute stored instructions, as well as a memory 906 that stores instructions that are executable by the processor 904. The processor 904 may be a single core processor, a multi-core processor, a computing cluster, or any number of other configurations. The memory 906 may include random access memory (RAM), read only memory (ROM), flash memory, or any other suitable memory systems. The processor 904 is connected through the bus 912 to one or more input and output devices. Further, the controller 100 includes a storage device 908 adapted to store different modules storing executable instructions for the processor 904. The storage device 908 may be implemented using a hard drive, an optical drive, a thumb drive, an array of drives, or any combinations thereof.

The storage device 908 is configured to store a system operation control module 910. The system operation control module 910 may correspond to the algorithm (Algorithm 1) explained in the detailed description of FIG. 4A. In some example embodiments, the processor 904 is configured to execute the system operation control module 910 to receive the input signal 104 indicative of the operation of the system 102 and rotate the test signal (e.g. the test signal 106) multiple times with different circular shifts to produce different rotations of the test signal forming the matrix data structure 110 with the input signal 104. Further, the processor 904 is configured to execute the system operation control module 910 to apply the sliding three-dimensional (3D) window method to the matrix data structure 110 to produce the statistics of the input signal 104 with respect to the rotations of the test signal 106 and control the operation of the system 102 according to the statistics of the input signal 104. The sliding 3D window method iteratively moves the window (e.g. the window 112) over the matrix data structure 110 to compute the value of the statistics for the segment of the matrix data structure 110 within the window. To compute the current value of the statistics of the input signal 104 for the window at the current location, the sliding 3D window method is configured to compute statistical observations of the current segment of the input signal within the window at the current location with respect to the current segments of each of the rotations of the test signal within the window at the current location using at least some corresponding statistical observations determined for the window at a previous location and determine the current value of the statistics of the input signal 104 from the statistical observations of the current segment of the input signal excluding the invalid statistical observations determined with respect to current segments of the rotations of the test signal violating monotonicity of the time-series data. Further, the sliding 3D window method is configured to move the window from the current location over the matrix data structure 110 to the next location.

Additionally, the controller 100 may include an output interface 918. In some implementations, the controller 100 is further configured to submit, via the output interface 918, the control commands to the actuators of the system 102. In some other implementations, the controller 100 is configured to submit, to the actuators of the system 102, the control commands subject to constraints of the operations of the system 102, via the output interface 918. In yet some other implementations, the controller 100 is configured to submit, to the system 102, control signals to stop the operation of the system 102, via the output interface 918.

The above description provides exemplary embodiments only, and is not intended to limit the scope, applicability, or configuration of the disclosure. Rather, the above description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Specific details are given in the above description to provide a thorough understanding of the embodiments. However, understood by one of ordinary skill in the art may be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination may correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine readable medium. A processor(s) may perform the necessary tasks.

Various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Although the present disclosure has been described with reference to certain preferred embodiments, it is to be understood that various other adaptations and modifications may be made within the spirit and scope of the present disclosure. Therefore, it is the aspect of the append claims to cover all such variations and modifications as come within the true spirit and scope of the present disclosure.

The invention claimed is:

1. A controller for controlling an operation of a system based on comparison of an input signal with a test signal, wherein the input signal and the test signal are time-series data having values monotonically measured over time, comprising: at least one processor; and memory having instructions stored thereon that, when executed by the at least one processor, cause the controller to:
receive the input signal indicative of the operation of the system;
rotate the test signal multiple times with different circular shifts to produce different rotations of the test signal forming a matrix data structure with the input signal;
apply a sliding three-dimensional (3D) window method to the matrix data structure to produce statistics of the input signal with respect to the rotations of the test signal, wherein the sliding 3D window method iteratively moves a window over the matrix data structure to compute a value of the statistics for a segment of the matrix data structure within the window, wherein, to compute a current value of the statistics of the input signal for the window at a current location, the sliding 3D window method is configured to:
compute statistical observations of a current segment of the input signal within the window at the current location with respect to current segments of each of the rotations of the test signal within the window at the current location using at least some corresponding statistical observations determined for the window at a previous location;
determine the current value of the statistics of the input signal from the statistical observations of the current segment of the input signal excluding statistical observations determined with respect to current segments of the rotations of the test signal that violate monotonicity of the time-series data; and
move the window from the current location over the matrix data structure to a next location; and
detect an anomaly in the statistics of the input signal and control the operation of the system based on the detected anomaly.

2. The controller of claim 1, wherein the sliding 3D window method computes multidimensional statistics of the input signal with different dimensions determined for windows of different sizes, wherein for computing a first dimension of the current value of the statistics of the input signal for the window at the current location, the sliding 3D window method reuses at least some statistical observations determined for an overlapping window of a different size than the size of the window at the current location.

3. The controller of claim 1, wherein the test signal is a copy of the input signal, such that the sliding 3D window method determines the statistics of the input signal with respect to itself by comparing different segments of the input signal with other segments of the input signal.

4. The controller of claim 1, wherein the test signal is different from the input signal to represent a normal operation of the system.

5. The controller of claim 1, wherein the test signal is multidimensional and includes multiple different sequences of series data collected from operations of different actuators of the system.

6. The controller of claim 1, wherein statistical observations considered for the window in the current location include a difference between values of the current segment of the input signal with values of each current segment of the rotations of the test signal with monotonic time indices, and wherein the current value of the statistics of the input signal is the maximum or the minimum of the considered statistical observations.

7. The controller of claim 6, wherein the difference defines an unnormalized Euclidean distance.

8. The controller of claim 1, wherein the controller rotates the test signal with a circular shift by moving a final entry of the test signal to a first position while shifting all other entries to the next position, or by moving a first entry of the test signal to a final position while shifting all other entries to a previous position, wherein a value of the circular shift determines a number of samples of the test signal forming an entry.

9. The controller of claim 1, wherein a value of a shift for moving the window in the sliding 3D window method equals a difference between neighboring values of the circular shifts for rotating the test signal.

10. The controller of claim 1, wherein the sliding 3D window method determines the statistics of the input signal using a double-ended queue method.

11. The controller of claim 1, wherein the sliding 3D window method determines the statistics of the input signal using a segment tree method.

12. The controller of claim 1, wherein the processor is configured to stop the operation of the system upon detecting the anomaly in the statistics of the input signal.

13. The controller of claim 1, wherein the processor is configured to determine control commands for an actuator of the system based on the statistics of the input signal.

14. The controller of claim 1, wherein the processor is configured to determine constraints of the operation of the system based on the statistics of the input signal and determine control commands for actuators of the system subject to the determined constraints.

15. The controller of claim 1, wherein the processor is configured to determine the statistics of the input signal at the end of an operational cycle of the system to adjust the operation of the system for the next operational cycle.

16. A method for controlling an operation of a system based on comparison of an input signal with a test signal, wherein the input signal and the test signal are time-series data having values monotonically measured over time, wherein the processor is coupled with stored instructions implementing the method, wherein the instructions, when executed by the processor carry out steps of the method, comprising:
   receiving the input signal indicative of the operation of the system;
   rotate the test signal multiple times with different circular shifts to produce different rotations of the test signal forming a matrix data structure with the input signal;
   applying a sliding three-dimensional (3D) window method to the matrix data structure to produce statistics of the input signal with respect to the rotations of the test signal, wherein the sliding 3D window method iteratively moves a window over the matrix data structure to compute a value of the statistics for a segment of the matrix data structure within the window, wherein, to compute a current value of the statistics of the input signal for the window at a current location, the sliding 3D window method comprises:
   computing statistical observations of a current segment of the input signal within the window at the current location with respect to current segments of each of the rotations of the test signal within the window at the current location using at least some corresponding statistical observations determined for the window at a previous location;
   determining the current value of the statistics of the input signal from the statistical observations of the current segment of the input signal excluding statistical observations determined with respect to current segments of the rotations of the test signal that violate monotonicity of the time-series data; and
   moving the window from the current location over the matrix data structure to a next location; and
   detecting an anomaly in the statistics of the input signal and controlling the operation of the system based on the detected anomaly.

17. A non-transitory computer readable storage medium embodied thereon a program executable by a processor for performing a method for controlling an operation of a system based on comparison of an input signal with a test signal, wherein the input signal and the test signal are time-series data having values monotonically measured over time, the method comprising:
   receiving the input signal indicative of the operation of the system;
   rotate the test signal multiple times with different circular shifts to produce different rotations of the test signal forming a matrix data structure with the input signal;
   applying a sliding three-dimensional (3D) window method to the matrix data structure to produce statistics of the input signal with respect to the rotations of the test signal, wherein the sliding 3D window method iteratively moves a window over the matrix data structure to compute a value of the statistics for a segment of the matrix data structure within the window, wherein, to compute a current value of the statistics of the input signal for the window at a current location, the sliding 3D window method comprises:
   computing statistical observations of a current segment of the input signal within the window at the current location with respect to current segments of each of the rotations of the test signal within the window at the current location using at least some corresponding statistical observations determined for the window at a previous location;
   determining the current value of the statistics of the input signal from the statistical observations of the current segment of the input signal excluding statistical observations determined with respect to current segments of the rotations of the test signal that violate monotonicity of the time-series data; and
   moving the window from the current location over the matrix data structure to a next location; and
   detecting an anomaly in the statistics of the input signal and controlling the operation of the system based on the detected anomaly.

* * * * *